United States Patent
Yu et al.

(10) Patent No.: US 12,199,903 B2
(45) Date of Patent: Jan. 14, 2025

(54) METHOD FOR OBTAINING CONFIGURATION INFORMATION OF DEMODULATION REFERENCE SIGNAL, CONFIGURATION METHOD, AND APPARATUS

(71) Applicant: Huawei Technologies Co., Ltd., Shenzhen (CN)

(72) Inventors: Yawei Yu, Shenzhen (CN); Chaojun Li, Beijing (CN); Zhiheng Guo, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 344 days.

(21) Appl. No.: 17/709,029

(22) Filed: Mar. 30, 2022

(65) Prior Publication Data
US 2022/0224481 A1   Jul. 14, 2022

Related U.S. Application Data

(63) Continuation of application No. PCT/CN2019/109741, filed on Sep. 30, 2019.

(51) Int. Cl.
*H04L 5/00* (2006.01)
*H04L 25/02* (2006.01)
(Continued)

(52) U.S. Cl.
CPC ........ *H04L 5/0048* (2013.01); *H04L 25/0224* (2013.01); *H04W 72/04* (2013.01); *H04W 72/0457* (2023.01); *H04W 72/23* (2023.01)

(58) Field of Classification Search
CPC ..... H04L 5/003; H04L 5/0048; H04L 5/0051; H04L 25/00; H04L 25/0224; H04W 72/00;
(Continued)

(56) References Cited

U.S. PATENT DOCUMENTS

2016/0087774 A1   3/2016 Guo et al.
2020/0036503 A1*  1/2020 Liu ................ H04L 5/0007
(Continued)

FOREIGN PATENT DOCUMENTS

CN   108023713 A   5/2018
CN   108633012 A   10/2018
(Continued)

OTHER PUBLICATIONS

"HARQ procedure for NR-U," 3GPP TSG RAN WG1 #96bis, R1-1904624, Xi'an, China, XP051691653, Total 11 pages, 3rd Generation Partnership Project, Valbonne, France (Apr. 8-12, 2019).
(Continued)

*Primary Examiner* — Warner Wong
(74) *Attorney, Agent, or Firm* — Leydig, Voit & Mayer, Ltd.

(57) ABSTRACT

A method includes: receiving first signaling, wherein the first signaling comprises demodulation reference signal (DMRS) patterns configured for N time units, each DMRS pattern is used to indicate a quantity of DMRSs in each time unit, the quantity of DMRSs in each time unit is a total quantity of time domain symbols occupied by all DMRSs in the time unit, DMRSs configured for at least two of the N time units occupy different total quantities of time domain symbols, and N is a positive integer greater than 1; and receiving or sending data in the N time units based on the total quantity of time domain symbols occupied by all the DMRSs in each time unit.

14 Claims, 13 Drawing Sheets

(51) Int. Cl.
*H04W 72/04* (2023.01)
*H04W 72/0457* (2023.01)
*H04W 72/23* (2023.01)

(58) Field of Classification Search
CPC . H04W 72/04; H04W 72/042; H04W 72/044; H04W 72/0457; H04W 72/12; H04W 72/1263; H04W 28/00; H04W 74/00; H04W 74/08
See application file for complete search history.

(56) References Cited

U.S. PATENT DOCUMENTS

| | | | |
|---|---|---|---|
| 2020/0106584 A1* | 4/2020 | Jiang | H04L 5/0053 |
| 2020/0136874 A1* | 4/2020 | Baldemair | H04L 5/005 |
| 2020/0328861 A1* | 10/2020 | Malladi | H04L 5/0069 |
| 2020/0336276 A1* | 10/2020 | Tang | H04W 4/40 |
| 2021/0007123 A1* | 1/2021 | Lee | H04L 27/2607 |
| 2021/0067290 A1* | 3/2021 | Chen | H04L 5/0033 |
| 2021/0127376 A1* | 4/2021 | Zeng | H04W 72/20 |
| 2021/0160026 A1* | 5/2021 | Wang | H04W 72/0446 |
| 2023/0344596 A1* | 10/2023 | Shin | H04L 5/0094 |

FOREIGN PATENT DOCUMENTS

| | | | |
|---|---|---|---|
| CN | 109587798 A | | 4/2019 |
| JP | 2016149583 A | | 8/2016 |
| JP | 2019520756 A | | 7/2019 |
| WO | 2017136079 A1 | | 8/2017 |
| WO | 2018082244 A1 | | 5/2018 |
| WO | 2018203788 A1 | | 11/2018 |
| WO | 2019021473 A1 | | 1/2019 |
| WO | 2019030894 A1 | | 2/2019 |
| WO | WO-2021056579 A1 * | 4/2021 | ............ H04W 72/04 |

OTHER PUBLICATIONS

"Discussion on DMRS sharing for uplink sTTI transmission," 3GPP TSG RAN WG1 Meeting #88b, R1-1705108, Spokane, USA, Total 3 pages, 3rd Generation Partnership Project, Valbonne, France (Apr. 3-7, 2017).

"3rd Generation Partnership Project; Technical Specification Group Radio Access Network; NR; Multiplexing and channel coding (Release 15)," 3GPP TS 38.212 V15.7.0, pp. 1-101, 3rd Generation Partnership Project, Valbonne, France (Sep. 2019).

* cited by examiner

METHOD FOR OBTAINING CONFIGURATION INFORMATION OF DEMODULATION REFERENCE SIGNAL, CONFIGURATION METHOD, AND APPARATUS

CROSS-REFERENCE TO RELATED APPLICATIONS

This application is a continuation of International Application No. PCT/CN2019/109741, filed on Sep. 30, 2019, the disclosure of which is hereby incorporated by reference in its entirety.

TECHNICAL FIELD

This application relates to the field of communication technologies, and in particular, to a method for configuring a demodulation reference signal, a method for obtaining configuration information of a demodulation reference signal, an apparatus, and a medium.

BACKGROUND

In a new radio (NR) system of a 5G radio access technology, downlink data is carried on a physical downlink shared channel (PDSCH), and uplink data is carried on a physical uplink shared channel (PUSCH). Transmitted data arrives at a receive end after passing through a radio fading channel. To correctly demodulate the transmitted data from a received signal, the receive end needs to accurately learn of the fading experienced by a radio channel. Therefore, when transmitting data in each transmission time interval (TTI), a 5G NR system inserts, on a bandwidth the same as that of the PDSCH or the PUSCH, a demodulation reference signal used as a pilot. The receive end performs channel estimation by using the received DMRS passing through the radio fading channel, and correctly demodulates the transmitted data.

A network device configures a DMRS pattern by using radio resource control (RRC). Then, the network device adds the RRC signaling including the DMRS pattern to the PDSCH for sending to a terminal device. A total quantity of time domain symbols occupied by all DMRSs in each TTI indicated by the DMRS pattern is the same. The terminal device sends or receives, in each TTI based on the DMRS pattern included in the RRC signaling, DMRSs with the same quantity of time domain symbols. Reference signal overheads in this manner are high.

SUMMARY

This application provides a method for configuring a demodulation reference signal, a method for obtaining configuration information of a demodulation reference signal, an apparatus, and a medium, to reduce DMRS pilot overheads.

According to a first aspect, an embodiment of this application discloses a method for obtaining configuration information of a DMRS. The method includes: receiving first signaling, where the first signaling includes DMRS patterns configured for N time units, each DMRS pattern is used to indicate a quantity of DMRSs in each time unit, the quantity of DMRSs in each time unit is a total quantity of time domain symbols occupied by all DMRSs in the time unit, DMRSs configured for at least two of the N time units occupy different total quantities of time domain symbols, and N is a positive integer greater than 1; and then, receiving or sending data in the N time units based on the total quantity of time domain symbols occupied by all the DMRSs in each time unit.

The method in this embodiment may be performed by a terminal device, or may be performed by a chip in a terminal device. If the method is performed by a chip, the chip may be a baseband processing chip, or may be a baseband processing chip and a radio frequency unit. In this case, a behavior of receiving a signal may be understood as a behavior of demodulating a signal by the baseband processing chip (such as a baseband processor) in the terminal device, a behavior of inputting a signal to the baseband processing chip, or a behavior of outputting a signal by the radio frequency unit to the baseband processing chip, so that the baseband processing chip demodulates the input signal to obtain data, configuration information, or the like. Correspondingly, a behavior of sending a signal may be understood as a behavior of generating an output signal by the baseband processing chip or a behavior of outputting a signal by the baseband processing chip to the radio frequency unit.

Correspondingly, according to a second aspect, an embodiment of this application discloses a method for configuring a DMRS. In the method, first signaling is sent to a terminal device, where the first signaling includes DMRS patterns configured for N time units, each DMRS pattern is used to indicate a quantity of DMRSs in each time unit, the quantity of DMRSs in each time unit is a total quantity of time domain symbols occupied by all DMRSs in the time unit, DMRSs configured for at least two of the N time units occupy different total quantities of time domain symbols, and N is a positive integer greater than 1; and then, receiving or sending data in the N time units based on the total quantity of time domain symbols occupied by all the DMRSs in each time unit.

The method in this embodiment may be performed by a network device (such as a base station), or may be performed by a chip in a network device. If the method is performed by a chip in a network device, the chip may be a baseband processing chip, or may be a baseband processing chip and a radio frequency unit. In this case, a behavior of receiving a signal may be understood as a behavior of demodulating a signal by the baseband processing chip (such as a baseband processor) in the network device, a behavior of inputting a signal to the baseband processing chip, or a behavior of outputting a signal by the radio frequency unit to the baseband processing chip, so that the baseband processing chip demodulates the input signal to obtain data, configuration information, or the like. Correspondingly, a behavior of sending a signal may be understood as a behavior of generating an output signal by the baseband processing chip or a behavior of outputting a signal by the baseband processing chip to the radio frequency unit.

In the method, because DMRSs configured for at least two of the N time units occupy different total quantities of time domain symbols, a total quantity of time domain symbols occupied by all DMRSs in each time unit can be flexibly configured. In addition, the total quantity of time domain symbols occupied by all DMRSs in each is determined based on the DMRS patterns configured for the N time units. Quantities of DMRSs in different time domain symbols may be different, so that DMRS pilot overheads can be reduced. In a possible implementation, the first signaling is RRC signaling. The RRC signaling may be carried on a PDSCH.

In a possible implementation, in the DMRS patterns that are configured for the N time units and that are included in the RRC signaling, a quantity of DMRSs configured for the first k time units in the N time units is greater than a quantity of DMRSs configured for other time units than the first k time units, k is a positive integer, and 1≤k≤N. That is, channel estimation is accurately performed by using more DMRS pilots in the first k time units, so that data of the DMRS transmitted on a data channel can be correctly demodulated. In addition, that the quantity of DMRSs configured for the first k time units is greater than the quantity of DMRs configured for the other time units than the first k time units facilitates reducing DMRS pilot overheads and improving system spectral efficiency. In this implementation, a DMRS density in the first k time units in the N time units is higher than a DMRS density of a subsequent time unit. This is briefly referred to as a dense-to-sparse structure. In this implementation, in the DMRS patterns configured for the N time units, a quantity of DMRSs configured for each of the first k time units is greater than a quantity of DMRSs configured or each of other time units than the first k time units.

In a possible implementation, in the DMRS patterns that are configured for the N time units and that are included in the RRC signaling, a quantity of DMRSs configured for the first k time units in the N time units and a quantity of DMRSs configured for the last m time units in the N time units are both greater than a quantity of DMRSs configured for other time units than the first k time units and the last m time units in the N time units, k is a positive integer, 1≤k<N−m, and 1≤m<N−k. That is, channel estimation is more accurately performed by using more DMRS pilots in the first k time units and the last m time units, and accurate interpolation estimation on a channel of another time unit is enabled. In addition, that the quantity of DMRSs configured for the first k time units in the N time units and the quantity of DMRSs configured for the last m time units in the N time units are both greater than the quantity of DMRSs configured for other time units than the first k time units and the last m time units facilitates reducing DMRS pilot overheads and improving system spectral efficiency. In this implementation, DMRS densities in the first k time units and the last m time units in the N time units are higher than a DMRS density in middle N−k−m time units. This is briefly referred to as a dense-sparse-dense structure. In this implementation, a quantity of DMRSs configured for each of the first k time units and the last m time units is greater than a quantity of DMRSs configured for each of the middle N−k−m time units. The DMRS density in the first k time units and the DMRS density in the last m time units may be the same or different. This is not limited in this implementation.

In a possible implementation, in the DMRS patterns that are configured for the N time units and that are included in the RRC signaling, each time unit in a first time unit set in the N time units is configured with a same quantity of DMRSs, the first time unit set includes at least one time unit in the N time units, the at least one time unit is a time unit starting from the $l_0^{th}$ time unit at an interval of L time units, $l_0$ is a positive integer, 1≤$l_0$≤N, and no DMRS has been configured for a time unit outside the first time unit set in the N time units or a quantity of configured DMRSs is less than the quantity of DMRSs configured for each time unit in the first time unit set. As can be learned, in this implementation, there is a DMRS at an interval of L time units, and a DMRS may not be sent on another time unit, thereby reducing DMRS overheads.

In a possible implementation, the DMRS patterns indicate a total quantity of DMRSs configured for each of the N time units, and the total quantity of DMRSs is a total quantity of front-loaded DMRSs and additional DMRSs.

In a possible implementation, the first signaling is downlink control information (DCI) signaling.

In a possible implementation, the DCI signaling includes a first index value, and the first index value corresponds to a quantity of DMRSs in each of the N time units.

In a possible implementation, the DCI signaling is scrambled by using a semi-persistent scheduling cell radio network temporary identity (sps-C-RNTI).

In a possible implementation, a total quantity of time domain symbols occupied by all the DMRSs in each time unit is a total quantity of time domain symbols occupied by all front-loaded DMRSs and all additional DMRSs in the time unit.

According to a third aspect, an embodiment of this application discloses a method for obtaining configuration information of a DMRS. The method includes: receiving DCI, where the DCI indicates scheduling information of a first time unit, the DCI includes a DMRS pattern configured for the first time unit, the DMRS pattern is used to indicate a quantity of DMRSs in the first time unit, and the quantity of DMRSs in the first time unit is a total quantity of time domain symbols occupied by all DMRSs in the first time unit; and then, receiving or sending data in the first time unit based on the total quantity of time domain symbols occupied by all the DMRSs in the first time unit and the scheduling information.

The method in this embodiment may be performed by a terminal device, or may be performed by a chip in a terminal device. If the method is performed by a chip, the chip may be a baseband processing chip, or may be a baseband processing chip and a radio frequency unit. In this case, a behavior of receiving a signal may be understood as a behavior of demodulating a signal by the baseband processing chip (such as a baseband processor) in the terminal device, a behavior of inputting a signal to the baseband processing chip, or a behavior of outputting a signal by the radio frequency unit to the baseband processing chip, so that the baseband processing chip demodulates the input signal to obtain data, configuration information, or the like. Correspondingly, a behavior of sending a signal may be understood as a behavior of generating an output signal by the baseband processing chip or a behavior of outputting a signal by the baseband processing chip to the radio frequency unit.

Correspondingly, according to a fourth aspect, an embodiment of this application discloses a method for configuring a DMRS. The method includes: sending downlink control information DCI to a terminal device, where the DCI indicates scheduling information of a first time unit, the DCI includes a DMRS pattern configured for the first time unit, the DMRS pattern is used to indicate a quantity of DMRSs in the first time unit, and the quantity of DMRSs in the first time unit is a total quantity of time domain symbols occupied by all DMRSs in the first time unit; and then, receiving or sending data in the first time unit based on the total quantity of time domain symbols occupied by all the DMRSs in the first time unit and the scheduling information.

The method in this embodiment may be performed by a network device (such as a base station), or may be performed by a chip in a network device. If the method is performed by a chip in a network device, the chip may be a baseband processing chip, or may be a baseband processing chip and a radio frequency unit. In this case, a behavior of receiving a signal may be understood as a behavior of demodulating a signal by the baseband processing chip (such as a baseband processor) in the network device, a behavior of inputting a signal to the baseband processing chip, or a behavior of outputting a signal by the radio frequency unit to the baseband processing chip, so that the baseband processing chip demodulates the input signal to obtain data, configuration information, or the like. Correspondingly, a behavior of sending a signal may be understood as a behavior of generating an output signal by the baseband processing chip or a behavior of outputting a signal by the baseband processing chip to the radio frequency unit.

In the third aspect and the fourth aspect, because total quantities of time domain symbols occupied by DMRSs in different time units may be indicated by different DCI, a total quantity of time domain symbols of all DMRSs in each time unit can be flexibly configured dynamically. In addition, a total quantity of time domain symbols occupied by all DMRSs in a time unit is configured by using the DCI. In this way, flexible configuration can be performed based on a requirement. For example, fewer DMRSs may be configured, thereby reducing DMRS pilot overheads.

The DCI may be carried on a PDCCH.

In a possible implementation, the DCI indicates the total quantity of DMRSs configured for the first time unit: or the first field includes an index value, and the index value indicates the total quantity of DMRSs configured for the first time unit. The total quantity of DMRSs is the total quantity of front-loaded DMRSs and additional DMRSs.

In a possible implementation, the DCI includes a quantity of DMRSs added to or deleted from the first time unit: or the first field includes an index value, and the index value includes a quantity of DMRSs added to or deleted from the first time unit. The total quantity of DMRSs configured for the first time unit is indicated by using the quantity of DMRSs added to or deleted from the first time unit. The total quantity of DMRSs is the total quantity of front-loaded DMRSs and additional DMRSs.

In a possible implementation, the DCI indicates that a total quantity of time domain symbols occupied by all DMRSs configured for the first time unit is 0.

In a possible implementation, the DCI indicates, by using a redundant state of code division multiplexing (CDM), that a total quantity of time domain symbols occupied by all DMRSs configured for the first time unit is 0.

In a possible implementation, based on the total quantity of time domain symbols occupied by all the DMRSs in the first time unit and the scheduling information, a manner for receiving data in the first time unit may be: demodulating, based on the scheduling information and a DMRS in the second time unit, the data received in the first time unit, where the second time unit is before the first time unit.

In a possible implementation, the DCI is scrambled by using an sps-C-RNTI.

According to a fifth aspect, this application further provides an apparatus. The apparatus may be a terminal device, may be an apparatus in a terminal device, or may be an apparatus that can be used with a terminal device. In a design, the apparatus may include modules that are in a one-to-one correspondence with the methods/operations/steps/actions described in the first aspect. The modules may be implemented by a hardware circuit, software, or a combination of a hardware circuit and software. In a design, the apparatus may include a communication module. For example, the communication module is configured to: receive first signaling, and receive or send data in N time units based on a total quantity of time domain symbols occupied by all DMRSs in each time unit. For descriptions of the first signaling, a DMRS pattern, and the like, refer to the corresponding descriptions in the first aspect.

According to a sixth aspect, this application further provides an apparatus. The apparatus may be a terminal device, may be an apparatus in a terminal device, or may be an apparatus that can be used with a terminal device. In a design, the apparatus may include modules that are in a one-to-one correspondence with the methods/operations/steps/actions described in the third aspect. The modules may be implemented by a hardware circuit, software, or a combination of a hardware circuit and software. In a design, the apparatus may include a communication module. For example, the communication module is configured to receive DCI, and receive or send data in a first time unit based on a total quantity of time domain symbols occupied by all DMRSs in the first time unit and scheduling information. For the DCI and the method for receiving data in the first time unit, refer to the corresponding descriptions in the third aspect.

According to a seventh aspect, this application further provides an apparatus. The apparatus may be a network device, may be an apparatus in a network device, or may be an apparatus that can be used with a network device. In a design, the apparatus may include modules that are in a one-to-one correspondence with the methods/operations/steps/actions described in the second aspect. The modules may be implemented by a hardware circuit, software, or a combination of a hardware circuit and software. In a design, the apparatus may include a communication module. For example, the communication module is configured to: send first signaling to a terminal device, and receive or send data in N time units based on a total quantity of time domain symbols occupied by all DMRSs in each time unit. For the first signaling and a DMRS pattern, refer to the corresponding descriptions in the second aspect.

According to an eighth aspect, this application further provides an apparatus. The apparatus may be a network device, may be an apparatus in a network device, or may be an apparatus that can be used with a network device. In a design, the apparatus may include modules that are in a one-to-one correspondence with the methods/operations/steps/actions described in the fourth aspect. The modules may be implemented by a hardware circuit, software, or a combination of a hardware circuit and software. In a design, the apparatus may include a communication module. For example, the communication module is configured to send DCI to a terminal device, and receive or send data in a first time unit based on a total quantity of time domain symbols occupied by all DMRSs in the first time unit and scheduling information. For the DCI and the method for receiving data in the first time unit, refer to the corresponding descriptions in the fourth aspect.

According to a ninth aspect, an embodiment of this application discloses an apparatus. The apparatus includes one or more processors, configured to implement the method according to the first aspect. The apparatus may further include a memory, configured to store instructions and data. The memory is coupled to the one or more processors. When the one or more processors execute instructions stored in the memory, the method according to the first aspect may be implemented. The apparatus may further include a communication interface. The communication interface is used by the apparatus to communicate with another device. For example, the communication interface may be a transceiver, a circuit, a bus, a module, or another type of communication interface.

The one or more processors are configured to: receive first signaling through the communication interface, and receive or send data in N time units based on a total quantity of time domain symbols occupied by all DMRSs in each time unit. For the first signaling and a DMRS pattern, refer to the corresponding descriptions in the first aspect.

According to a tenth aspect, an embodiment of this application discloses an apparatus. The apparatus includes one or more processors, configured to implement the method according to the third aspect. The apparatus may further include a memory, configured to store instructions and data. The memory is coupled to the one or more processors. When the one or more processors execute instructions stored in the memory, the method according to the second aspect may be implemented. The apparatus may further include a communication interface. The communication interface is used by the apparatus to communicate with another device. For example, the communication interface may be a transceiver, a circuit, a bus, a module, or another type of communication interface.

The one or more processors are configured to: receive DCI through the communication interface, and receive or send data in a first time unit based on a total quantity of time domain symbols occupied by all DMRSs in the first time unit and scheduling information. For the DCI and the method for receiving data in the first time unit, refer to the corresponding descriptions in the third aspect.

According to an eleventh aspect, an embodiment of this application discloses an apparatus. The apparatus includes one or more processors, configured to implement the method according to the second aspect. The apparatus may further include a memory, configured to store instructions and data. The memory is coupled to the one or more processors. When the one or more processors execute instructions stored in the memory, the method according to the second aspect may be implemented. The apparatus may further include a communication interface. The communication interface is used by the apparatus to communicate with another device. For example, the communication interface may be a transceiver, a circuit, a bus, a module, or another type of communication interface.

The one or more processors are configured to: send first signaling to a terminal device through the communication interface, and receive or send data in N time units based on a total quantity of time domain symbols occupied by all DMRSs in each time unit. For the first signaling and a DMRS pattern, refer to the corresponding descriptions in the second aspect.

According to a twelfth aspect, an embodiment of this application discloses an apparatus. The apparatus includes one or more processors, configured to implement the method according to the first aspect. The apparatus may further include a memory, configured to store instructions and data. The memory is coupled to the one or more processors. When the one or more processors execute instructions stored in the memory, the method according to the fourth aspect may be implemented. The apparatus may further include a communication interface. The communication interface is used by the apparatus to communicate with another device. For example, the communication interface may be a transceiver, a circuit, a bus, a module, or another type of communication interface.

The one or more processors are configured to: send DCI to a terminal device through the communication interface, and receive or send data in a first time unit based on a total quantity of time domain symbols occupied by all DMRSs in the first time unit and scheduling information. For the DCI and the method for receiving data in the first time unit, refer to the corresponding descriptions in the fourth aspect.

According to a thirteenth aspect, an embodiment of this application further provides a computer-readable storage medium, including instructions. When the instructions are run on a computer, the computer is enabled to perform the method according to the first aspect or the third aspect.

According to a fourteenth aspect, an embodiment of this application further provides a computer-readable storage medium, including instructions. When the instructions are run on a computer, the computer is enabled to perform the method according to the second aspect or the fourth aspect.

According to a fifteenth aspect, an embodiment of this application provides a chip system. The chip system includes one or more processors, and may further include a memory, configured to implement the method according to the first aspect or the third aspect. The chip system may include a chip, or may include a chip and another discrete component.

According to a sixteenth aspect, an embodiment of this application provides a chip system. The chip system includes a processor, and may further include a memory, configured to implement the method according to the second aspect or the fourth aspect. The chip system may include a chip, or may include a chip and another discrete component.

According to a seventeenth aspect, an embodiment of this application provides a system. The system includes the apparatus according to the fifth aspect or the ninth aspect and the apparatus according to the seventh aspect or the eleventh aspect.

According to an eighteenth aspect, an embodiment of this application provides a system. The system includes the apparatus according to the sixth aspect or the tenth aspect and the apparatus according to the eighth aspect or the twelfth aspect.

DESCRIPTION OF EMBODIMENTS

Figure 1:
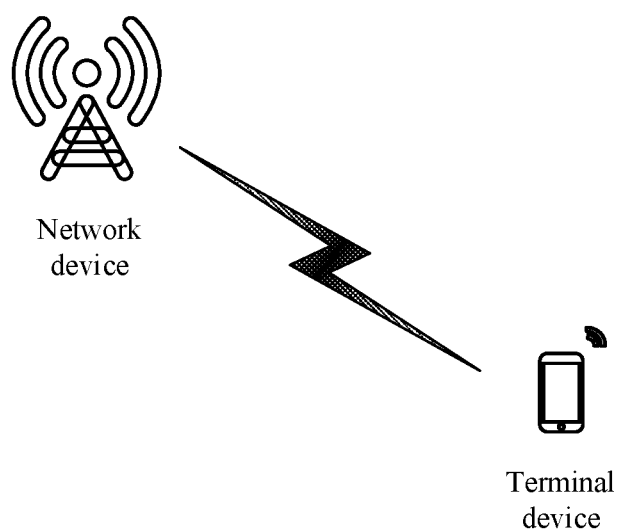
FIG. 1 is a schematic diagram of a structure of a communication system according to an embodiment of this application.

The following describes embodiments of this application with reference to the accompanying drawings.

The following describes some terms in embodiments of this application, to facilitate understanding of a person skilled in the art.

(1) Terminal device: The terminal device includes a device that provides voice and/or data connectivity for a user. Specifically, the terminal device includes a device that provides voice for the user, includes a device that provides data connectivity for the user, or includes a device that provides voice and data connectivity for the user. For example, the terminal device may include a handheld device having a wireless connection function or a processing device connected to a wireless modem. The terminal device may communicate with a core network through a radio access network (RAN), and exchange voice or data with the RAN, or interact voice and data with the RAN. The terminal device may include user equipment (UE), a wireless terminal device, a mobile terminal device, a device-to-device (D2D) communication terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU).

In the embodiments of this application, it may also be understood that all devices that can perform data communication with the base station may be considered as terminal devices.

(2) Network device: The network device includes, for example, an access network (AN) device such as a base station (for example, an access point), and may be a device that communicates with a wireless terminal device over an air interface through one or more cells in an access network. Alternatively, for example, a network device in a vehicle-to-everything (V2X) technology is a road side unit (RSU). The base station may be configured to: mutually convert a received over-the-air frame and an IP packet and serve as a router between a terminal device and a remaining portion of the access network, where the remaining portion of the access network may include an IP network. The RSU may be a fixed infrastructure entity supporting a V2X application, and may exchange a message with another entity supporting the V2X application. The network device may further coordinate attribute management of the air interface. For example, the network device may include an LTE system or an evolved base station (NodeB, eNB, or e-NodeB, evolutional Node B) in a long term evolution-advanced (LTE-A) system, may include next generation NodeB (next generation node B, gNB) in a 5G NR system (also briefly referred to as an NR system), or may include a centralized unit (CU) and a distributed unit (DU) in a cloud radio access network (Cloud RAN) system. This is not limited in the embodiments of this application.

(3) Relay: For a cellular wireless communication network such as NR or LTE, a method for adding an intermediate node may be used to improve performance at an edge of a cellular cell. Such an intermediate node is generally referred to as a relay, a relay node, a relay apparatus, a relay device, or the like. The relay may be configured to receive a signal from a terminal device, and forward the received signal from the terminal device to a network device. The relay may be implemented by using a terminal device, or may be implemented by using a network device, for example, may be implemented by using a wireless access point (AP).

(4) A time unit may be, for example, a slot or a subframe: or may be another time unit, for example, a mini-slot (mini slot). One mini-slot may include a plurality of OFDM symbols or DFT-S-OFDM symbols.

(5) Slot: It may be configured in an NR system that one slot includes 14 orthogonal frequency division multiplexing (OFDM) symbols. For example, a slot length corresponding to a 15 kHz subcarrier spacing is 1 ms, and a slot length corresponding to a 30 kHz subcarrier spacing is 0.5 ms.

(6) The terms "system" and "network" in embodiments of this application may be used interchangeably. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit a sequence, a time sequence, priorities, or importance of the plurality of objects. For example, a first value and a second value are merely used to distinguish between different values, and do not indicate different content, different priorities, different importance degrees, or the like of the two values.

The following describes the communication system implemented in this application. FIG. 1 is a schematic diagram of a structure of a communication system according to an embodiment of this application. The communication system may include at least one terminal device and at least one network device. The terminal device establishes a communication connection to the network device.

In a conventional method for configuring a DMRS, the network device indicates, by using RRC signaling, a total quantity of time domain symbols occupied by all DMRSs of the terminal device. This DMRS configuration is applicable to each configured TTI. In this way, each TTI is configured with a same total quantity of time domain symbols occupied by all DMRSs. When channel quality is poor, an insufficient quantity of DMRSs reduces accuracy of channel estimation; and when channel quality is good, a large quantity of DMRSs causes high DMRS pilot overheads. Based on this, the conventional method for configuring a DMRS cannot adapt to a channel characteristic. Moreover, if a quantity of configured DMRSs is too larger, the DMRS pilot overheads are high. Therefore, in a conventional technology, a total quantity of time domain symbols occupied by all DMRSs in each TTI cannot be flexibly configured.

An embodiment of this application includes the following steps:

The network device sends first signaling, and the terminal device receives the first signaling.

The first signaling includes DMRS patterns configured for N time units, each DMRS pattern is used to indicate a quantity of DMRSs in each time unit, the quantity of DMRSs in each time unit is a total quantity of time domain symbols occupied by all DMRSs in the time unit, DMRSs configured for at least two of the N time units occupy different total quantities of time domain symbols, and N is a positive integer greater than 1.

The terminal device may receive or send data in the N time units based on the total quantity of time domain symbols occupied by all the DMRSs in each time unit. Correspondingly, the network device may also send or receive data based on the total quantity of time domain symbols occupied by all DMRSs in each time unit.

In this embodiment, for a sending side, sending data in the N time units based on the total quantity of time domain symbols occupied by all the DMRSs in each time unit is mapping a DMRS to a data channel based on the total quantity of time domain symbols occupied by all the DMRSs in each time unit and sending the data channel. For a receiving side, receiving data in the N time units based on the total quantity of time domain symbols occupied by all the DMRSs in each time unit is determining a position of a DMRS based on the total quantity of time domain symbols occupied by all the DMRSs in each time unit and performing channel estimation based on the DMRS to correctly demodulate data transmitted on the data channel.

According to this embodiment of this application, the network device can flexibly configure a total quantity of time domain symbols occupied by all DMRSs in each time unit in the N time units, thereby reducing DMRS pilot overheads.

In this embodiment of this application, resource allocation of a DMRS pattern in a time-frequency domain is configured, but position mapping of the DMRS on a time-frequency resource is further related to a mapping type of a PUSCH (or a mapping type of a PDSCH), a quantity of symbols scheduled in each time unit, and the like. This embodiment of this application is mainly used to describe whether the network device configures a DMRS for at least one time unit. If a DMRS is configured for a time unit, the network device may further indicate a quantity of configured DMRSs. The DMRSs may include front-loaded DMRSs and additional DMRSs.

In this embodiment of this application, a quantity of DMRSs is a quantity of DMRSs configured for one time unit.

The quantity of DMRSs in each time unit is a total quantity of time domain symbols occupied by all DMRSs in the time unit. In this embodiment of this application, the total quantity of DMRSs is the total quantity of front-loaded DMRSs and additional DMRSs. The network device configures a total quantity of DMRSs for a time unit, and the total quantity of DMRSs is used to indicate a quantity of DMRSs configured by the network device for the time unit. If the total quantity of DMRSs is 2, it indicates that the network device has configured two DMRSs for the time unit, which are one front-loaded DMRS and one additional DMRS, and the network device configures that each DMRS occupies two time domain symbols. In this case, a total quantity of time domain symbols occupied by all DMRSs in the time unit is 4, that is, a quantity of DMRSs in the time unit is 4.

A total quantity of time domain symbols occupied by all the DMRSs in each time unit is a total quantity of time domain symbols occupied by all front-loaded DMRSs and all additional DMRSs in the time unit.

The quantity of additional DMRSs may be 0, and the quantity of front-loaded DMRSs may also be 0.

The first signaling may be RRC signaling or DCI signaling. The DCI signaling is carried on a PDCCH. The DCI signaling may further be used to schedule a PDSCH and/or a PUSCH, that is, indicate configuration information such as a time-frequency resource on which data is transmitted or a modulation scheme. A quantity of DMRSs in each time unit can be dynamically configured in real time by using the DCI signaling, and the flexibility is high.

In a conventional method for configuring a DMRS, a quantity of DMRSs is configured by using a value of a field in a DMRS pattern and is sent to the terminal device by using the RRC signaling.

TABLE 1

| DMRS pattern-related field | | | |
|---|---|---|---|
| Field (Field) | dmrs-type | maxLength | dmrs-additionalPosition |
| Configuration value | Type 1/ Type 2 | Single/ Double | Pos 0, pos 1, pos 2, and pos 3 Pos 0 and pos 1 |

In Table 1, dmrs-type determines a resource pattern of a front-loaded DMRS in frequency domain. When dmrs-type is configured as type 1, each physical resource block (PRB) in frequency domain has two groups of CDMs, and six subcarriers of each group of CDMs may support data transmission of two layers by using an orthogonal cover code (OCC). Therefore, in type 1, a single symbol can support data transmission of four layers. When dmrs-type is configured as type 2, each PRB in frequency domain has three groups of CDMs, and four subcarriers of each group of CDMs may support two layers by using an OCC. Therefore, in type 2, a single symbol can support data transmission of six layers.

In Table 1, maxlength determines a quantity of symbols of a front-loaded DMRS in time domain. When maxlength is configured as single, a front-loaded DMRS occupies only one time domain symbol in time domain. When maxlength is configured as double, a front-loaded DMRS may occupy two consecutive symbols in time domain.

When the front-loaded DMRS occupies one time domain symbol, if an additional DMRS is configured, each additional DMRS also occupies one time domain symbol. When the front-loaded DMRS occupies two consecutive time domain symbols, if an additional DMRS is configured, each additional DMRS also occupies two consecutive time domain symbols.

In Table 1, dmrs-additionalPosition determines whether to configure an additional DMRS in the time unit. When AdditionalPosition is configured as pos 0, it indicates that no additional DMRS has been configured in the time unit. When AdditionalPosition is configured as pos 1, it indicates that one additional DMRS has been configured in the time unit. When AdditionalPosition is configured as pos 2, it indicates that two additional DMRSs have been configured in the time unit. When AdditionalPosition is configured as pos 3, it indicates that three additional DMRSs have been configured in the time unit.

Figure 2:
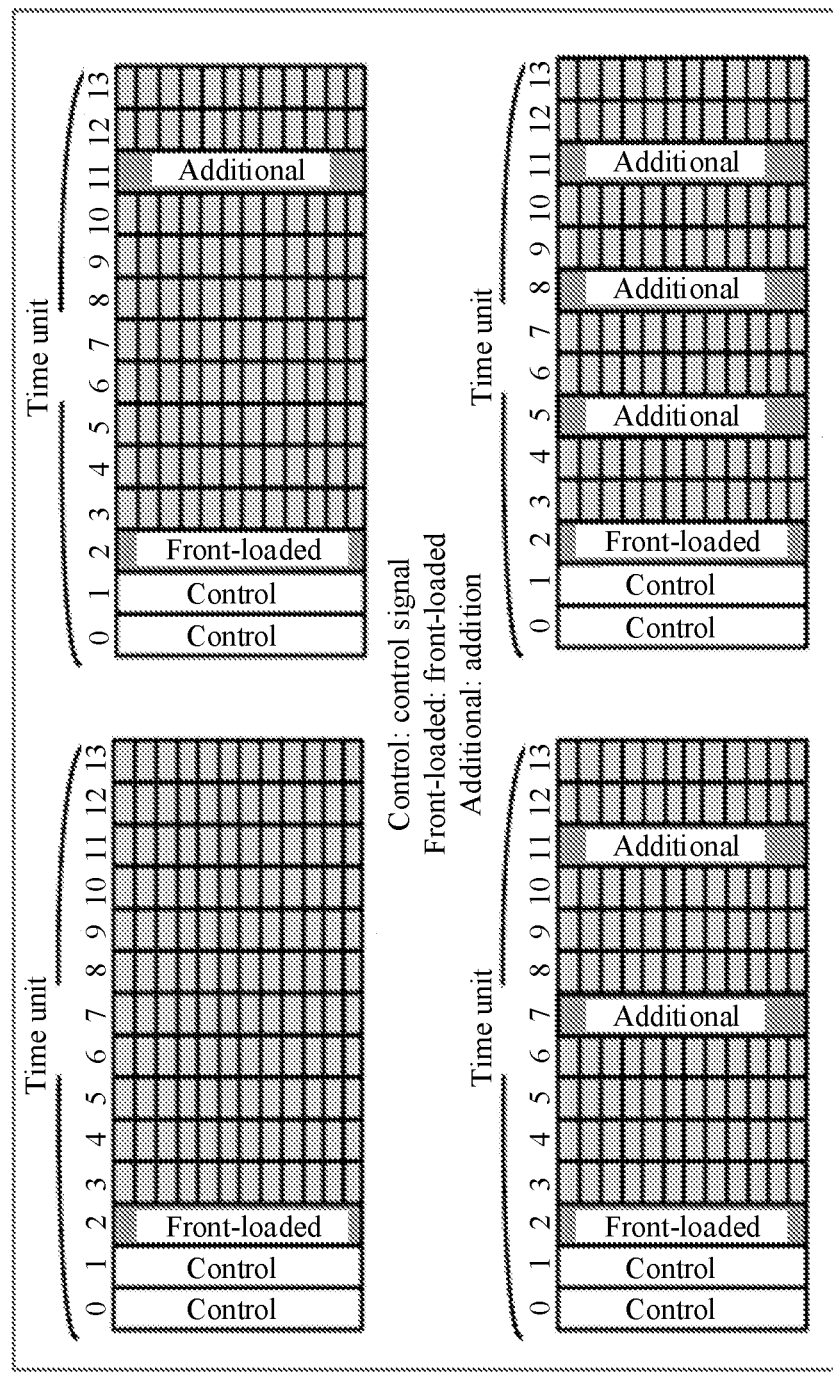
FIG. 2 is a schematic diagram of a resource pattern of a DMRS according to an embodiment of this application.

A schematic diagram of a DMRS pattern shown in FIG. 2 is used as an example. It is assumed that maxlength is configured as single, that is, a front-loaded DMRS occupies one time domain symbol, the network device may enable, by configuring dmrs-additionalPosition as pos 0, pos 1, pos 2, or pos 3, DMRSs to occupy different quantities of DMRSs in time domain, so as to meet a requirement of accurate channel estimation. Based on this, when maxlength is configured as single, the network device may configure dmrs-additionalPosition as pos 0, pos 1, pos 2, or pos 3.

Figure 3:
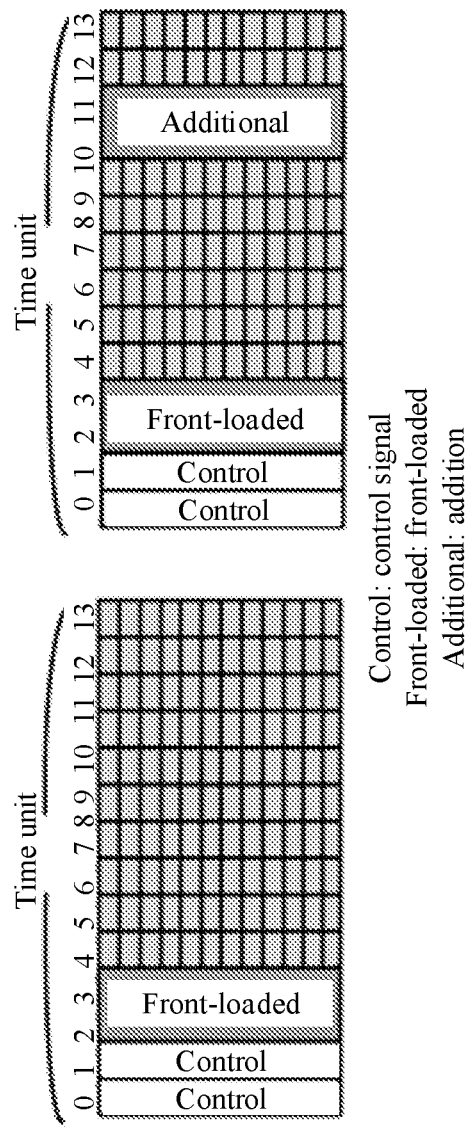
FIG. 3 is a schematic diagram of a resource pattern of another DMRS according to an embodiment of this application.

A schematic diagram of a DMRS pattern shown in FIG. 3 is used as an example. It is assumed that maxlength is configured as double, and a front-loaded DMRS occupies two time domain symbols, the network device may enable, by configuring dmrs-additionalPosition as pos 0 or pos 1, DMRSs to occupy different quantities of DMRSs in time domain, so as to meet a requirement of accurate channel estimation. Based on this, when maxlength is configured as double, the network device may configure dmrs-additionalPosition as pos 0) or pos 1.

In an implementation, the network device may configure a quantity of time units by using RRC signaling, that is, a value of N. The network device may further configure dmrs-Type, maxlength, a quantity of DMRSs, and the like of the N time units by using the RRC signaling, where dmrs-Type and maxlength of the N time units may become DMRS configuration information.

In an implementation, the network device may indicate a time domain symbol starting position of a DMRS by using DCI signaling when a current time unit is a PDSCH/PUSCH of type A. For example, when a value of a corresponding field in DCI is 0, it indicates that the front loaded DMRS starts from the third time domain symbol position: or when a value of a corresponding field in DCI is 1, it indicates that the front loaded DMRS starts from the fourth time domain symbol position, and latency is low:

The network device may indicate, by using the DCI signaling, whether a mapping type of a DMRS in a current time unit is type 1 or type 2. A DMRS of type 2 can support more users or more parallel data streams. When a channel condition is good or more terminal devices need to be supported, dmrs-Type may be configured as type 2.

The network device may indicate maxlength of the DMRS in the current time unit by using the DCI signaling, to be specific, the front-loaded DMRS occupies one time domain symbol or two consecutive time domain symbols. When maxlength=2, twice as many users/data streams can be supported by using a time domain OCC.

For example, the network device may dynamically indicate a DMRS of one time unit. For example, a new field 1 bit is added to the DCI signaling to indicate two states: type 1 and type 2, or to indicate whether a state is reversed compared with a predefined state.

For example, the network device may semi-statically indicate, for example, indicate whether update needs to be performed by using the DCI signaling scrambled by an sps-C-RNTI. An indication method of the 1 bit newly added to the DCI signaling is the same as that described above. If no DCI scrambled by using the sps-C-RNTI indicates update, a DMRS configuration the same as a previous one is used.

In an implementation, if the network device configures DMRS patterns for a plurality of time units by using the first signaling, in other words, DMRS configurations of the plurality of time units are jointly configured, at least one of the plurality of time units may have no DMRS or a small quantity of configured DMRSs. That a small quantity of DMRSs are configured for at least one of the plurality of time units may be understood as that the quantity of DMRSs configured for the at least one time unit is less than a quantity of DMRSs configured for other time units than the at least one time unit in the plurality of time units. For a time unit configured with no DMRS or a small quantity of DMRSs, the terminal device may reuse, during channel estimation, a channel estimation result of one or more nearest time units configured with a DMRS or a large quantity of DMRSs. To be specific, the terminal device may demodulate, based on the scheduling information and the DMRS in the second time unit, data received in the first time unit, where the second time unit is before the first time unit. Optionally, for the time unit configured with no DMRS or a small quantity of DMRSs, the terminal device may intercept several time units by using a time window, and perform joint channel estimation on all time units configured with DMRSs in the several intercepted time units, to obtain a channel estimation result. The terminal device may use the channel estimation result as a channel estimation result of the time unit configured with no DMRS or a small quantity of DMRSs. For example, the time window intercepts five time units, and two of which are configured with a larger quantity of DMRSs. In this case, the terminal device may perform joint channel estimation on the two time units, and use a channel estimation result obtained through joint channel estimation as a channel estimation result of a time unit configured with no DMRS or a smaller quantity of DMRSs.

TABLE 2

| Spectrum efficiency | Period | Column 1 | Column 2 | Column 3 | Column 4 |
|---|---|---|---|---|---|
| SNR = −2.5 | Period = 1 | 1.397244 | 1.618939 | 1.435662 | 1.282932 |
| | Period = 5 | 1.53397 | 1.863307 | 1.826651 | 1.796105 |
| | Period = 10 | 1.590187 | 1.891869 | 1.875525 | 1.860252 |
| | Period = 20 | 1.580047 | 1.909283 | 1.900214 | 1.892656 |

In Table 2, an example in which DMRS patterns are periodically configured for a plurality of time units is used to show pilot overheads that can be reduced and spectral efficiency gains that can be achieved when periodic DMRS configuration is performed for different quantities of time units. Period=1 indicates that DMRS configuration is performed by using 1 time unit as a period. Period=5 indicates that DMRS configuration is performed by using 5 time units as a period. In the 5 time units, the first time unit is configured with a DMRS, and the remaining four time units have not been configured with a DMRS. Period=10 indicates that DMRS configuration is performed by using 10 time units as a period. In the 10 time units, the first time unit is configured with a DMRS, and the remaining nine time units have not been configured with a DMRS. Period=20 indicates that DMRS configuration is performed by using 20 time units as a period. In the 20 time units, the first time unit is configured with a DMRS, and the remaining 19 time units have not been configured with a DMRS. Column 1 indicates that one DMRS is configured. Column 2 indicates that two DMRSs are configured. Column 3 indicates that three DMRSs are configured. Column 4 indicates that four DMRSs are configured. The unit of spectral efficiency (Spectral efficiency, SE) is bps/Hz. SNR=−2.5 dB indicates a signal-to-noise ratio of a current transmission channel.

Simulation parameter settings are as follows: 3 Km/h moving speed, TDL-E fading channel (LoS), MIMO configuration of 2T8R, bandwidth of 5 MHZ, PDSCH-Mapping Type=type A, dmrs-Type=type 1, maxlength=single, and additionalPosition=pose 2.

Simulation results show that high spectral efficiency can be achieved when DMRS time domain symbols in column 2 are used. In addition, channel estimation is not accurate enough when one DMRS time domain symbol is used. This results in unsatisfactory data demodulation and affects the spectral efficiency. When three or four DMRS time domain symbols are used, DMRS pilot overheads are large. This results in unsatisfactory spectral efficiency. Therefore, the quantity of DMRSs needs to be properly configured. For example, the DMRS pilot overheads are appropriately reduced when channel estimation accuracy is ensured based on a channel condition.

Figure 4:
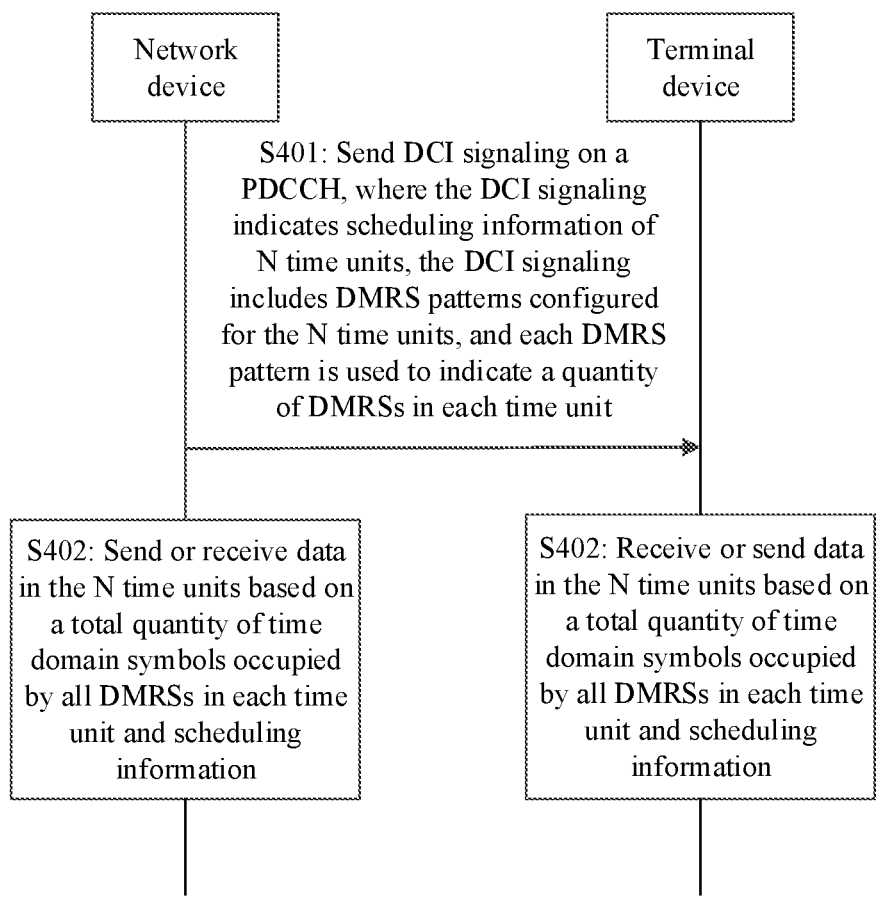
FIG. 4 is a schematic flowchart of a method for configuring a DMRS according to an embodiment of this application.

Based on the communication system shown in FIG. 1, refer to FIG. 4. FIG. 4 shows a method for configuring a DMRS according to an embodiment of this application. The method includes but is not limited to the following steps.

Step S401: A network device sends DCI signaling to a terminal device on a PDCCH, and the terminal device receives the DCI signaling. The DCI signaling indicates scheduling information of N time units, the DCI signaling includes DMRS patterns configured for the N time units, and each DMRS pattern is used to indicate a quantity of DMRSs in each time unit, where N≥1, and N is a positive integer.

The scheduling information may be used to indicate configuration information such as a time-frequency resource position for transmitting uplink data or a modulation scheme, or the scheduling information is used to indicate configuration information such as a time-frequency resource position for transmitting downlink data or a modulation scheme.

In an implementation, the network device may dynamically configure a DMRS in each time unit. To be specific, the network device sends the DCI to the terminal device, where the DCI indicates scheduling information of a first time unit, the DCI includes a DMRS pattern configured for the first time unit, and the DMRS pattern is used to indicate a quantity of DMRSs in the first time unit. The first time unit may be any one of the at least one time unit.

The network device may dynamically configure a DMRS in each time unit in the following seven manners:

1. The DCI signaling includes a redundant state of CDM, and the redundant state of CDM is used to indicate that no DMRS has been configured for the first time unit. In other words, the DCI indicates, by using the redundant state of CDM, that a total quantity of time domain symbols occupied by all DMRSs configured for the first time unit is 0.

For example, if a DMRS in a time unit needs to be released, the network device may indicate, based on a redundant state of a CDM & DMRS port indicated in the DCI signaling, that no DMRS symbol has been configured for the time unit. For example, the network device may indicate a redundant state of a DMRS antenna port based on the DCI signaling. When dmrs-type=1, maxlength=1, and rank=1, CDM values 6 and 7 in TR38.212 Table 7.3.1.1.2-7 are un-configured values. Therefore, it may be configured that the CDM value 6 is used to indicate that no DMRS has been configured for the time unit.

2. The DCI signaling includes a first field, and the first field includes the total quantity of DMRSs configured for the first time unit.

During specific implementation, the network device may add a dmrsChange field to the DCI signaling, where the field includes the total quantity of DMRSs configured for the first time unit. For example, it is assumed that the network device has configured two DMRSs for the first time unit. In this case, the network device may add a dmrsChange field to the DCI signaling, where a value of the dmrsChange field is 2; and the network device sends the DCI including the newly added dmrsChange field to the terminal device. The terminal device may determine, based on the value of the dmrsChange field in the DCI, that the network device has configured two DMRSs for the first time unit.

3. The DCI signaling includes a first field, the first field includes an index value, and the index value indicates the total quantity of DMRSs configured for the first time unit.

During specific implementation, the network device may add a dmrsChange field to the DCI signaling, where the field includes an index value, the index value indicates the total quantity of DMRSs configured for the first time unit, and the total quantity of DMRSs is a total quantity of front-loaded DMRSs and additional DMRSs.

TABLE 3

First field used to indicate the total quantity of DMRSs

| dmrsChange field | Additional position | Quantity of DMRSs | Remarks |
|---|---|---|---|
| 00 | 0 | 1 | Quantity of DMRSs = |
| 01 | 1 | 2 | quantity of additional |

TABLE 3-continued

First field used to indicate the total quantity of DMRSs

| dmrsChange field | Additional position | Quantity of DMRSs | Remarks |
|---|---|---|---|
| 10 | 2 | 3 | DMRSs + quantity of front-loaded DMRSs (that is, 1) |
| 11 | 3 | 4 | |

In Table 3, it is assumed that maxlength is configured as single. In this case, dmrs-additionalPosition may be pos 0, pos 1, pos 2, or pos 3, that is, an additional DMRS with any value in 0 to 3 may be configured. If the network device has configured one front-loaded DMRS for the time unit, the total quantity of DMRSs configured by the network device may be any value in 1 to 4. The network device may add 2 bits to the DCI signaling to indicate the total quantity of DMRSs configured for the time unit, that is, a length of the dmrsChange field is 2 bits. For example, if the dmrsChange field is "00", it indicates that the total quantity of DMRSs configured by the network device for the time unit is 1, that is, one front-loaded DMRS has been configured for the time unit, and no additional DMRS has been configured for the time unit. If the dmrsChange field is "01", it indicates that the total quantity of DMRSs configured by the network device for the time unit is 2, that is, one front-loaded DMRS has been configured for the time unit, and one additional DMRS has been configured for the time unit. If the dmrsChange field is "10", it indicates that the total quantity of DMRSs configured by the network device for the time unit is 3, that is, one front-loaded DMRS has been configured for the time unit, and two additional DMRSs have been configured for the time unit. If the dmrsChange field is "11", it indicates that the total quantity of DMRSs configured by the network device for the time unit is 4, that is, one front-loaded DMRS has been configured for the time unit, and three additional DMRSs have been configured for the time unit.

For example, it is assumed that maxlength is configured as double. In this case, dmrs-additionalPosition may be pos 0 or pos 1, that is, zero or one additional DMRS may be configured. If the network device has configured one front-loaded DMRS for the time unit, the total quantity of DMRSs configured by the network device may be 1 or 2. The network device may add 1 bit to the DCI signaling to indicate the total quantity of DMRSs configured for the time unit, that is, a length of the dmrsChange field is 1 bit. For example, if the dmrsChange field is "0", it indicates that the total quantity of DMRSs configured by the network device for the time unit is 1, that is, one front-loaded DMRS has been configured for the time unit, and no additional DMRS has been configured for the time unit. If the dmrsChange field is "1", it indicates that the total quantity of DMRSs configured by the network device for the time unit is 2, that is, one front-loaded DMRS has been configured for the time unit, and one additional DMRS has been configured for the time unit.

In the foregoing example, the network device has configured one front-loaded DMRS for the time unit. Therefore, the total quantity of DMRSs configured for the time unit is at least one. If the network device has not configured any DMRS for the time unit, the network device may indicate, by using a redundant state of CDM, that no DMRS has been configured for the time unit.

TABLE 4

First field used to indicate the total quantity of DMRSs

| dmrsChange field | Additional position | Quantity of DMRSs | Remarks |
|---|---|---|---|
| 000 | | | No DMRS has been configured |
| 001 | 0 | 1 | Quantity of DMRSs = quantity of additional DMRSs + quantity of front-loaded DMRSs (that is, 1) |
| 010 | 1 | 2 | |
| 011 | 2 | 3 | |
| 100 | 3 | 4 | |
| 101-111 | | | Reserved |

In Table 4, it is assumed that maxlength is configured as single. In this case, dmrs-additionalPosition may be pos 0, pos 1, pos 2, or pos 3, that is, an additional DMRS with any value in 0 to 3 may be configured. If no front-loaded DMRS has been configured for the time unit, the total quantity of DMRSs configured by the network device for the time unit is 0. If one front-loaded DMRS has been configured for the time unit, the total quantity of DMRSs configured by the network device for the time unit is any value in 1 to 4. The network device may add 3 bits to the DCI signaling to indicate the total quantity of DMRSs configured for the time unit, that is, a length of the dmrsChange field is 3 bits. For example, if the dmrsChange field is "000", it indicates that the total quantity of DMRSs configured by the network device for the time unit is 0, that is, no DMRS has been configured for the time unit. If the dmrsChange field is "001", it indicates that the total quantity of DMRSs configured by the network device for the time unit is 1. If the dmrsChange field is "010", it indicates that the total quantity of DMRSs configured by the network device for the time unit is 2. If the dmrsChange field is "011", it indicates that the total quantity of DMRSs configured by the network device for the time unit is 3. If the dmrsChange field is "100", it indicates that the total quantity of DMRSs configured by the network device for the time unit is 4.

For example, it is assumed that maxlength is configured as double. In this case, dmrs-additionalPosition may be pos 0 or pos 1, that is, zero or one additional DMRS may be configured. If no front-loaded DMRS has been configured for the time unit, the total quantity of DMRSs configured by the network device is 0. If one front-loaded DMRS has been configured for the time unit, the total quantity of DMRSs configured by the network device may be 1 or 2. The network device may add 2 bits to the DCI signaling to indicate the total quantity of DMRSs configured for the time unit, that is, a length of the dmrsChange field is 2 bits. For example, if the dmrsChange field is "00", it indicates that the network device has not configured any DMRS for the time unit. If the dmrsChange field is "01", it indicates that the total quantity of DMRSs configured by the network device for the time unit is 1. If the dmrsChange field is "10", it indicates that the total quantity of DMRSs configured by the network device for the time unit is 2.

4. The DCI indicates that a total quantity of time domain symbols occupied by all DMRSs configured for the first time unit is 0.

For example, when the network device has not configured any DMRS for the time unit, the DCI indicates that the total quantity of time domain symbols occupied by all DMRSs configured for the first time unit is 0.

TABLE 5

Index indication of a DMRS antenna port

| Index value | CDM group | DMRS port |
|---|---|---|
| 0 | 1 | 0, 1 |
| 1 | 2 | 0, 1 |
| 2 | 2 | 2, 3 |
| 3 | 3 | 0, 1 |
| 4 | 3 | 2, 3 |
| 5 | 3 | 4, 5 |
| 6 | 2 | 0, 2 |
| 7 to 15 | Reserved | Reserved |

It is assumed that the network device configures dmrs-type as type 2 and configures MaxLength as single (in the present invention, maxlength being single is equivalent to maxlength=1). In Table 5, the network device indicates, by using 4 bits in the DCI signaling, a number of a DMRS antenna port used by the time unit and CDM in which a DMRS pilot is located. CDM numbers corresponding to the index values 7 to 15 are reserved. The network device may define that the index value 7 indicates that no DMRS has been configured for the time unit.

5. The DCI signaling includes a first field, the first field includes a quantity of DMRSs added to or deleted from the first time unit, the quantity of added DMRSs is a quantity of DMRSs added relative to a pre-configured total quantity of DMRSs, that is, the quantity of DMRSs added based on the pre-configured total quantity of DMRSs. The quantity of deleted DMRSs is a quantity of DMRSs deleted relative to the pre-configured total quantity of DMRSs, that is, the quantity of DMRSs deleted based on the pre-configured total quantity of DMRSs. The pre-configured total quantity of DMRSs may be pre-configured by the network device by using RRC signaling. The terminal device may determine, based on the first field and the pre-configured total quantity of DMRSs, the total quantity of DMRSs configured for the first time unit.

During specific implementation, the network device may add a dmrsChange field to the DCI signaling, where the field includes the quantity of DMRSs added to or deleted from the first time unit.

For example, it is assumed that maxlength is configured as single. In this case, on the basis of the pre-configured total quantity of DMRSs, the quantity of DMRSs that may be added by the network device is 0, 1, 2, or 3, in other words, the total quantity of DMRSs obtained after the addition may be 0, 1, 2, 3, or 4. On the basis of the pre-configured total quantity of DMRSs, the quantity of DMRSs that may be deleted by the network device is 0, 1, 2, 3, or 4, in other words, the total quantity of DMRSs obtained after the deletion may be 0, 1, 2, 3, or 4. In other words, on the basis of the pre-configured total quantity of DMRSs, the quantity of DMRSs added or deleted by the network device may be −4, −3, −2, −1, 0, 1, 2, or 3. If the value of the dmrsChange field is "−4", it indicates that the network device deletes four DMRSs on the basis of the pre-configured total quantity of DMRSs. If the value of the dmrsChange field is "−3", it indicates that the network device deletes three DMRSs on the basis of the pre-configured total quantity of DMRSs. If the value of the dmrsChange field is "−2", it indicates that the network device deletes two DMRSs on the basis of the pre-configured total quantity of DMRSs. If the value of the dmrsChange field is "−1", it indicates that the network device deletes one DMRS on the basis of the pre-configured total quantity of DMRSs. If the value of the dmrsChange field is "1", it indicates that the network device adds one DMRS on the basis of the pre-configured total quantity of DMRSs. If the value of the dmrsChange field is "2", it indicates that the network device adds two DMRSs on the basis of the pre-configured total quantity of DMRSs. If the value of the dmrsChange field is "3", it indicates that the network device adds three DMRSs on the basis of the pre-configured total quantity of DMRSs. If the value of the dmrsChange field is "0", it indicates that the total quantity of DMRSs configured by the network device for the first time unit is the pre-configured total quantity of DMRSs.

For example, it is assumed that maxlength is configured as double. In this case, on the basis of the pre-configured total quantity of DMRSs, the quantity of DMRSs that may be added by the network device is 0 or 1, in other words, the total quantity of DMRSs obtained after the addition may be 0, 1, or 2. On the basis of the pre-configured total quantity of DMRSs, the quantity of DMRSs that may be deleted by the network device is 0, 1, or 2, in other words, the total quantity of DMRSs obtained after the deletion may be 0, 1, or 2. In other words, on the basis of the pre-configured total quantity of DMRSs, the quantity of DMRSs added or deleted by the network device may be −2, −1, 0, or 1. If the value of the dmrsChange field is "−2", it indicates that the network device deletes two DMRSs on the basis of the pre-configured total quantity of DMRSs. If the value of the dmrsChange field is "−1", it indicates that the network device deletes one DMRS on the basis of the pre-configured total quantity of DMRSs. If the value of the dmrsChange field is "1", it indicates that the network device adds one DMRS on the basis of the pre-configured total quantity of DMRSs. If the value of the dmrsChange field is "0", it indicates that the total quantity of DMRSs configured by the network device for the first time unit is the pre-configured total quantity of DMRSs.

6. The DCI signaling includes a first field, the first field includes an index value, and the index value is used to indicate the quantity of DMRSs added to or deleted from the first time unit.

For example, the network device defines the index value of the dmrsChange field in the DCI signaling, where the index value is used to indicate the quantity of DMRSs added or deleted on the basis of the pre-configured total quantity of DMRSs.

TABLE 6

Index value of the quantity of added or deleted DMRSs

| Index value | Quantity of added or deleted DMRSs | Remarks |
|---|---|---|
| 000 | −4 | Total quantity of DMRSs obtained after the addition or deletion = max {pre-configured total quantity of DMRSs + quantity of added or deleted DMRSs, 0} |
| 001 | −3 | |
| 010 | −2 | |
| 011 | −1 | |
| 100 | 0 | |
| 101 | 1 | |
| 110 | 2 | |
| 111 | 3 | |

It is assumed that the network device configures MaxLength as single, the network device may add 3 bits to the DCI signaling to indicate the quantity of DMRSs added to or deleted from the first time unit, that is, a length of the dmrsChange field is 3 bits. In Table 6, the index value "000" indicates that the quantity of DMRSs deleted by the network device from the time unit is 4. The index value "001" indicates that the quantity of DMRSs deleted by the network device from the time unit is 3. The index value "010"

indicates that the quantity of DMRSs deleted by the network device from the time unit is 2. The index value "011" indicates that the quantity of DMRSs deleted by the network device from the time unit is 1. The index value "100" indicates that the quantity of DMRSs added or deleted by the network device to or from the time unit is 0. The index value "101" indicates that the quantity of DMRSs added by the network device to the time unit is 1. The index value "110" indicates that the quantity of DMRSs added by the network device to the time unit is 2. The index value "111" indicates that the quantity of DMRSs added by the network device to the time unit is 3.

7. When the DCI signaling does not include the redundant state of CDM and the first field, the DCI signaling is used to indicate that the quantity of DMRSs is determined in a pre-defined configuration manner.

Optionally, the pre-defined configuration manner may be a conventional DMRS configuration manner. The network device may configure the quantity of DMRSs by using a value of a related field in a DMRS pattern, and send the quantity of DMRSs to the terminal device by using the RRC signaling. For example, dmrs-type is configured as type 2, maxlength is configured as single, and additionalPosition is configured as pos 1. That is, pre-configured DMRSs have three CDM groups. Two DMRSs are configured for the first time unit, to be specific, one front-loaded DMRS and one additional DMRS. The front-loaded DMRS occupies one time domain symbol, and the additional DMRS occupies one time domain symbol. In other words, the total quantity of time domain symbols occupied by all DMRSs in the first time unit is 2.

Optionally, the pre-defined configuration manner may be obtained through negotiation between the network device and the terminal device.

In an implementation, the network device may dynamically configure DMRSs of a plurality of time units. To be specific, the DCI signaling sent by the network device to the terminal device includes DMRS patterns configured for N time units, and each DMRS pattern is used to indicate a quantity of DMRSs in each time unit, where N>1, and N is a positive integer.

During specific implementation, the network device may add a dmrsChange field to the DCI signaling, where the field includes a first index value, and the first index value corresponds to the quantity of DMRSs in each of the N time units. For example, the network device may determine, based on DMRS configuration information and a pre-defined mapping relationship, the first index value corresponding to the DMRS configuration information. After receiving the DCI signaling, the terminal device may determine the DMRS configuration information based on the first index value and the mapping relationship, for example, configure one DMRS for each slot included in the N time units.

TABLE 7

Index value used to indicate the quantity of DMRSs configured for the N time units

| Index value | N | DMRS pattern |
|---|---|---|
| 000 | 1 | One DMRS for each slot |
| 001 | 1 | Two DMRSs for each slot |
| 010 | 5 | Two DMRSs for the first slot |
| 011 | 10 | Four DMRSs for the first slot |
| 100 | 10 | Two DMRSs at an interval of five slots |
| 101 | 15 | Four DMRSs for the first slot |

TABLE 7-continued

Index value used to indicate the quantity of DMRSs configured for the N time units

| Index value | N | DMRS pattern |
|---|---|---|
| 110 | 15 | Three DMRSs at an interval of seven slots |
| 111 | 20 | Three DMRSs at an interval of ten slots |

In Table 7, it is assumed that maxlength is configured as single. The index value "000" indicates that the network device configures a DMRS for one time unit, and the network device configures one DMRS for each slot included in the time unit. The index value "001" indicates that the network device configures a DMRS for one time unit, and the network device configures two DMRSs for each slot included in the time unit. The index value "010" indicates that the network device configures a DMRS for five time units, and the network device configures two DMRSs for the first slot included in the five time units, and configures no DMRS for the remaining four slots. The index value "011" indicates that the network device configures a DMRS for ten time units, and the network device configures four DMRSs for the first slot included in the ten time units, and configures no DMRS for the remaining nine slots. The index value "100" indicates that the network device configures a DMRS for ten time units, and the network device configures two DMRSs at an interval of five slots included in the ten time units, and so on.

For example, a time unit is a TTI. One time unit may include L slots, and L is a positive integer. In LTE, L=2, to be specific, two slots are scheduled during each time of transmission.

TABLE 8

Index value used to indicate the quantity of DMRSs configured for the N time units

| Index value | N | DMRS pattern |
|---|---|---|
| 000 | 1 | One DMRS for each slot |
| 001 | 1 | Two DMRSs for each slot |
| 010 | 5 | Two DMRSs for the first slot |
| 011 | 5 | One DMRS for each slot |
| 100 | 5 | One DMRS at an interval of two slots |
| 101 | 10 | Three DMRSs for the first slot |
| 110 | 10 | One DMRS for each slot |
| 111 | 10 | One DMRS at an interval of five slots |

In Table 8, it is assumed that maxlength is configured as single. The index value "000" indicates that the network device configures a DMRS for one time unit, and the network device configures one DMRS for each slot included in the time unit. The index value "001" indicates that the network device configures a DMRS for one time unit, and the network device configures two DMRSs for each slot included in the time unit. The index value "010" indicates that the network device configures a DMRS for five time units, and the network device configures two DMRSs for the first slot included in the five time units, and configures no DMRS for the remaining four slots. The index value "011" indicates that the network device configures a DMRS for five time units, and the network device configures one DMRS for each slot included in the five time units. The index value "100" indicates that the network device configures a DMRS for five time units, and the network device configures one DMRS at an interval of two slots included in the five time units, and so on.

Any table in the embodiments of this application may be pre-defined by the network device, or may be configured by the network device by using higher layer signaling.

Step S402: The terminal device receives data in the N time units based on a total quantity of time domain symbols occupied by all DMRSs in each time unit and the scheduling information: or the terminal device maps a DMRS pilot to a data channel based on a total quantity of time domain symbols occupied by all DMRSs in each time unit and the scheduling information, and sends the data channel. Correspondingly, the network device maps a DMRS pilot to a data channel based on the total quantity of time domain symbols occupied by all the DMRSs in each time unit and the scheduling information, and sends the data channel: or the network device receives, in the N time units based on the total quantity of time domain symbols occupied by all the DMRSs in each time unit and the scheduling information, data carried on the data channel on which the DMRS pilot is located.

When the scheduling information is used to indicate configuration information such as a time-frequency resource position for transmitting uplink data or a modulation scheme, the terminal device may send data in the N time units based on the total quantity of time domain symbols occupied by all the DMRSs in each time unit and the scheduling information. For example, the terminal device sends data to the network device in the N time units based on the total quantity of time domain symbols occupied by all the DMRSs in each time unit and the scheduling information, and the network device may receive the data from the terminal device in the N time units based on the total quantity of time domain symbols occupied by all the DMRSs in each time unit and the scheduling information.

When the scheduling information is used to indicate configuration information such as a time-frequency resource position for transmitting downlink data or a modulation scheme, the terminal device may receive data in the N time units based on the total quantity of time domain symbols occupied by all the DMRSs in each time unit and the scheduling information. For example, the network device may send data to the terminal device in the N time units based on the total quantity of time domain symbols occupied by all the DMRSs in each time unit and the scheduling information, and the terminal device receives the data from the network device in the N time units based on the total quantity of time domain symbols occupied by all the DMRSs in each time unit and the scheduling information.

In the method described in FIG. 4, the network device sends the DCI signaling to the terminal device on the PDCCH, where the DCI signaling indicates the scheduling information of the N time units, the DCI signaling includes the DMRS patterns configured for the N time units, and each DMRS pattern is used to indicate the quantity of DMRSs in each time unit. The terminal device receives or sends data in the N time units based on the total quantity of time domain symbols occupied by all the DMRSs in each time unit and the scheduling information. In this way, the channel characteristic can be adapted to in real time. For example, when the channel quality is poor, the network device configures a larger quantity of DMRSs to improve performance of channel estimation and performance of correct demodulation on data. When the channel quality is good, the network device configures a smaller quantity of DMRSs to reduce the DMRS pilot overheads and flexibly configure a DMRS dynamically. In addition, the RRC signaling further includes many processes such as connection management, radio bearer control, and connection mobility. Transmission of the RRC signaling to the terminal device requires a long time, and it is difficult to configure a DMRS pattern in a short time. However, in this embodiment of this application, a DMRS pattern configured for at least one time unit is indicated by using DCI signaling, so that the DMRS pattern can be configured in a short time, thereby improving spectral efficiency.

Figure 5:
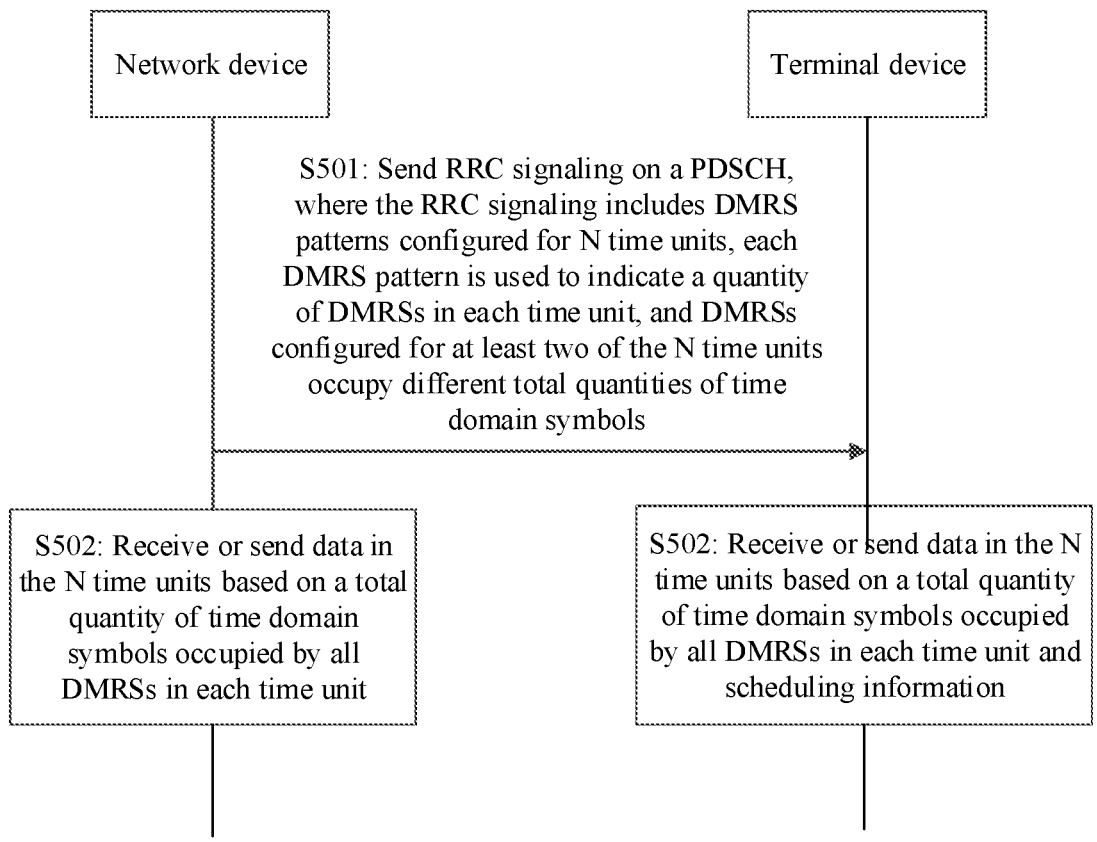
FIG. 5 is a schematic flowchart of another method for configuring a DMRS according to an embodiment of this application.

Based on the image processing method shown in FIG. 1, refer to FIG. 5. FIG. 5 shows another method for configuring a DMRS according to an embodiment of this application. The method includes but is not limited to the following steps.

Step S501: A network device sends, to a terminal device, RRC signaling carried on a PDSCH; and the terminal device receives the RRC signaling. The RRC signaling includes DMRS patterns configured for N time units, each DMRS pattern is used to indicate a quantity of DMRSs in each time unit, DMRSs configured for at least two of the N time units occupy different total quantities of time domain symbols, and N is a positive integer greater than 1.

The RRC signaling may further indicate DMRS configuration information of the N time units. The DMRS configuration information may be used to indicate a value of the quantity N of the N time units, a DMRS type DMRS-Type (optionally, DMRS-type may be set to type 1 or type 2, as shown in Table 1) of the N time units, or a maximum quantity of time domain symbols maxlength (optionally, a value of maxlength may be set to 1 or 2, as shown in Table 1) that may be occupied by each front-loaded/additional DMRS in the N time units.

During specific implementation, the network device may jointly configure DMRSs of a plurality of time units. The network device may jointly configure the DMRSs of the plurality of time units in the following four manners:

1. In the DMRS patterns that are configured for the N time units and that are included in the RRC signaling, a quantity of DMRSs configured for the first k time units in the N time units is greater than a quantity of DMRSs configured for other time units than the first k time units, k is a positive integer, and 1≤k<N. A quantity of DMRSs configured for each of the first k time units may be the same or different. Similarly, a quantity of DMRSs configured for each of the other time units may be the same or different.

This manner may also be referred to as a dense-to-sparse configuration manner. To be specific, a DMRS density of a front time unit in the N time units is higher than a DMRS density configured for a rear time unit.

For example, k=1. In the DMRS patterns that are configured for the N time units and that are included in the RRC signaling, a quantity of DMRSs configured for the first time unit in the N time units is greater than a quantity of DMRSs configured for another time unit other than the first time unit in the N time units.

During specific implementation, the network device configures a larger quantity of DMRSs for the first time unit in the N time units, and configures a smaller quantity of DMRSs for each of the second time unit to the $N^{th}$ time unit.

Figure 6:
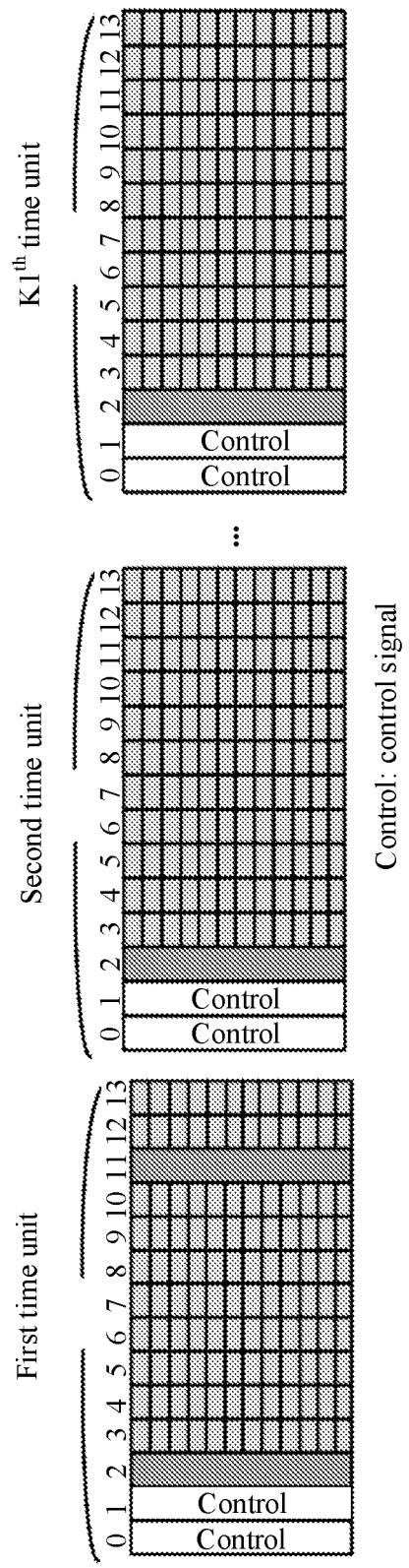
FIG. 6 is a schematic diagram of a resource pattern of another DMRS according to an embodiment of this application.

A schematic diagram of a DMRS pattern shown in FIG. 6 is used as an example. It is assumed that N=K1. The network device configures two DMRSs for the first time unit in K1 time units, including one front-loaded DMRS and one additional DMRS, where the front-loaded DMRS occupies one time domain symbol, and the additional DMRS occupies one time domain symbol. The network device configures one DMRS for each of the second time unit to a $K1^{th}$ time unit in the K1 time units, that is, one front-loaded DMRS, where the front-loaded DMRS occupies one time domain symbol.

2. In the DMRS patterns that are configured for the N time units and that are included in the RRC signaling, a quantity of DMRSs configured for the first k time units in the N time units and a quantity of DMRSs configured for the last m time units in the N time units are both greater than a quantity of DMRSs configured for other time units than the first k time units and the last m time units in the N time units, k is a positive integer, $1 \leq k < N-m$, and $1 \leq m < N-k$. A quantity of DMRSs configured for each of the first k time units may be the same or different. A quantity of DMRSs configured for each of the last m time units may be the same or different. Similarly, a quantity of DMRSs configured for each of the other time units may be the same or different. In addition, a quantity of DMRSs configured for each of the first k time units and the last m time units may be the same or different.

This manner may also be referred to as a dense-sparse-dense configuration manner. To be specific, DMRS densities of a front time unit and a rear time unit in the N time units are higher than a DMRS density configured for a middle time unit.

For example, k=1 and m=1. The RRC signaling is used to indicate a DMRS pattern configured for each of the N time units. A quantity of DMRSs configured for the first time unit in the N time units is greater than a quantity of DMRSs configured for each of the second time unit to an $(N-1)^{th}$ time unit in the N time units. The quantity of DMRSs configured for the $N^{th}$ time unit in the N time units is greater than the quantity of DMRSs configured for each of the second time unit to the $(N-1)^{th}$ time unit in the plurality of time units. The quantity of DMRSs configured for the first time unit in the N time units is independent of the quantity of DMRSs configured for the $N^{th}$ time unit in the N time units. A relationship between the quantity of DMRSs configured for the first time unit in the N time units and the quantity of DMRSs configured for the $N^{th}$ time unit in the N time units is not limited in this embodiment of this application.

During specific implementation, the network device configures a larger quantity of DMRSs for each of the first time unit and the $N^{th}$ time unit in the N time units, and configures a smaller quantity of DMRSs for each of the second time unit to the $(N-1)^{th}$ time unit.

Figure 7:
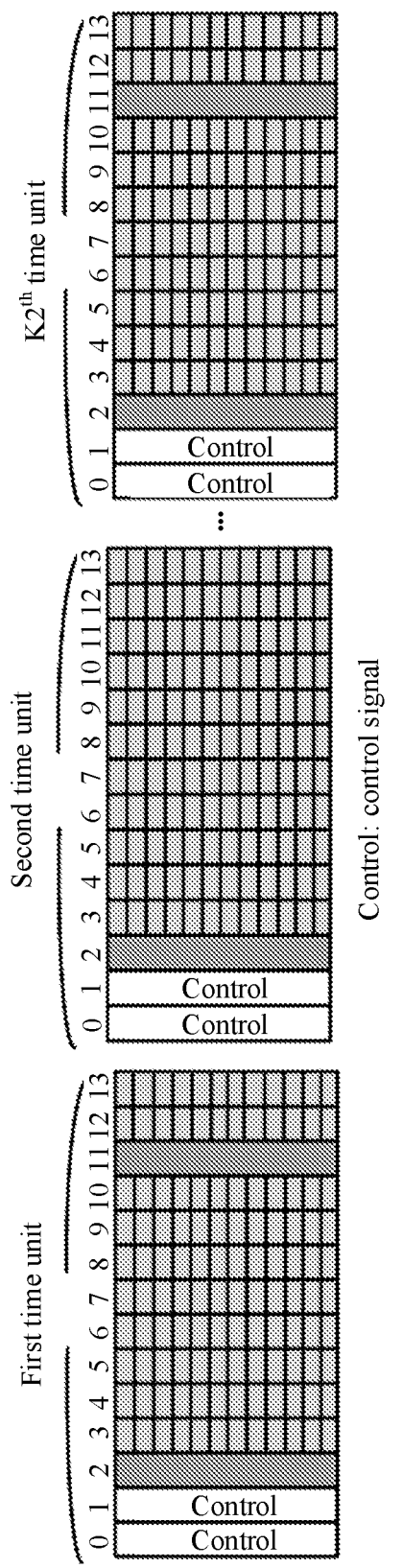
FIG. 7 is a schematic diagram of a resource pattern of another DMRS according to an embodiment of this application.
Figure 8A:
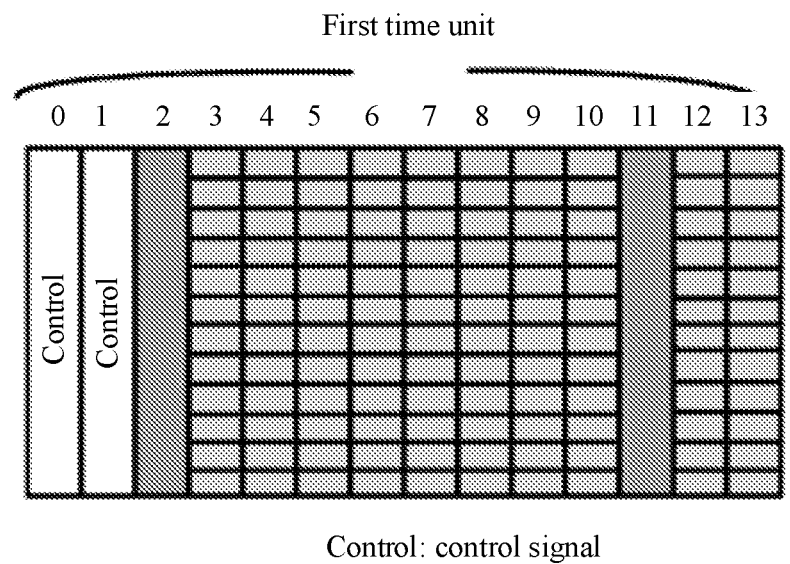
FIG. 8A to FIG. 8F are a schematic diagram of a resource pattern of another DMRS according to an embodiment of this application.
Figure 8B:
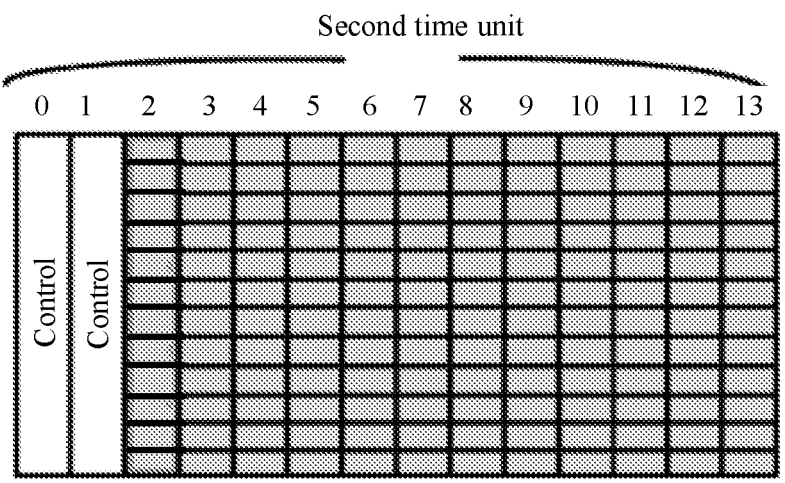
Figure 8C:
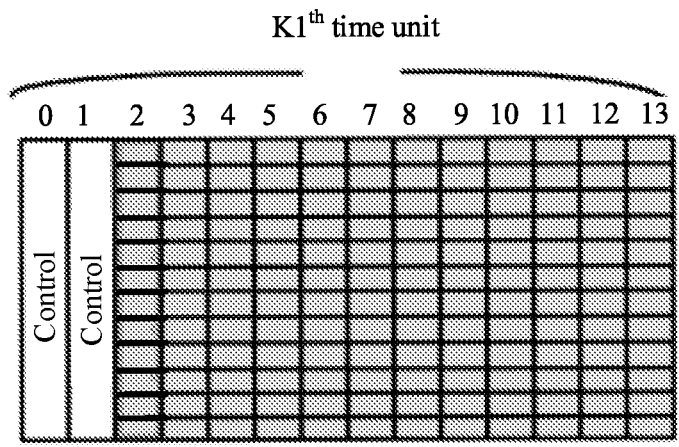
Figure 8D:
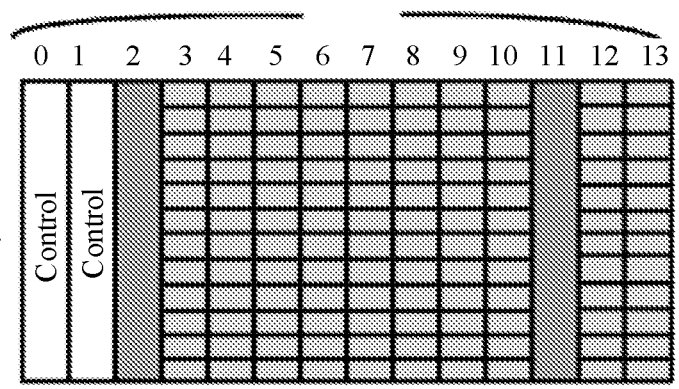
Figure 8E:
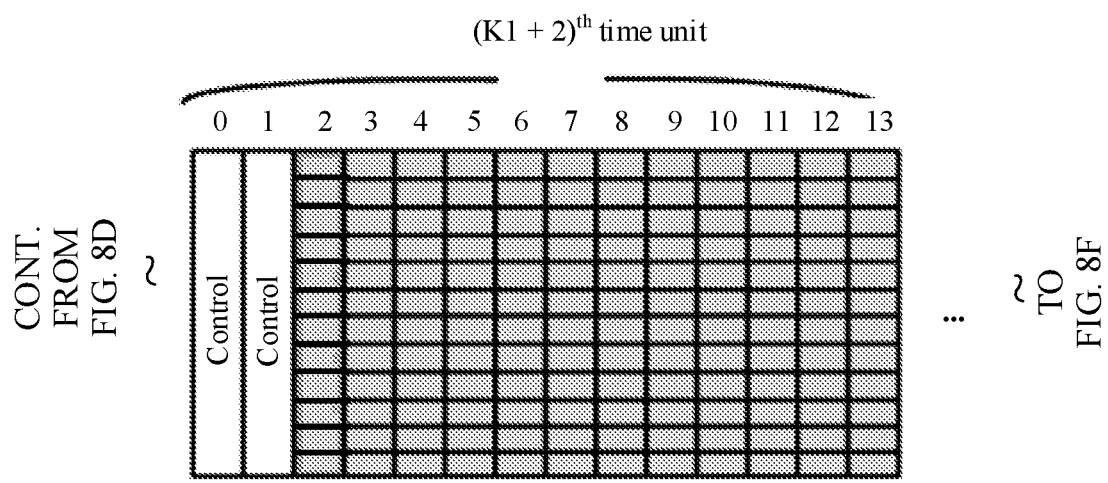
Figure 8F:
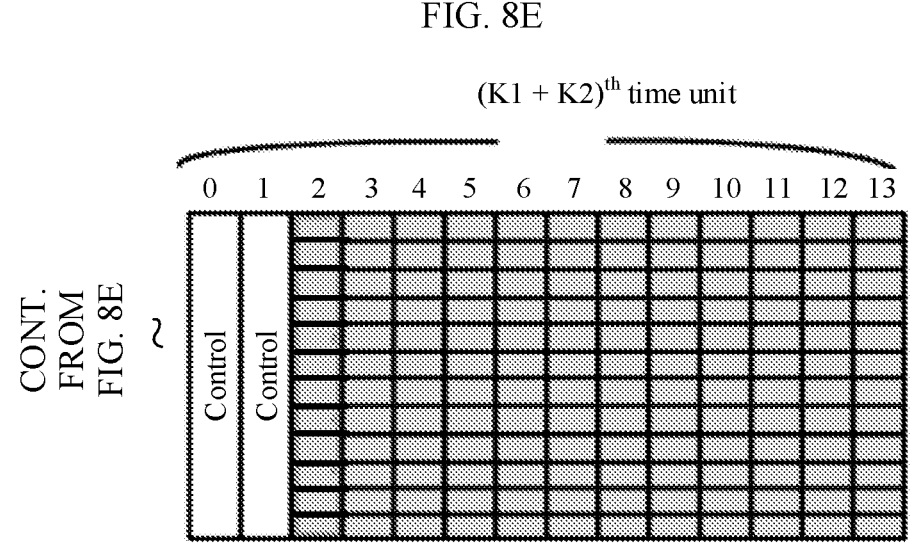

A schematic diagram of a DMRS pattern shown in FIG. 7 is used as an example. It is assumed that N=K2. The network device configures two DMRSs for the first time unit in K2 time units, including one front-loaded DMRS and one additional DMRS, where the front-loaded DMRS occupies one time domain symbol, and the additional DMRS occupies one time domain symbol. The network device configures one DMRS for each of the second time unit to a $(K2-1)^{th}$ time unit in the K2 time units, that is, one front-loaded DMRS, where the front-loaded DMRS occupies one time domain symbol. The network device configures two DMRSs for a $K2^{th}$ time unit in the K2 time units, including one front-loaded DMRS and one additional DMRS, where the front-loaded DMRS occupies one time domain symbol, and the additional DMRS occupies one time domain symbol.

3. In the DMRS patterns that are configured for the N time units and that are included in the RRC signaling, each time unit in a first time unit set in the N time units is configured with a same quantity of DMRSs, the first time unit set includes at least one time unit in the N time units, the at least one time unit is a time unit starting from the $l_0^{th}$ time unit at an interval of L time units, $l_0$ is a positive integer, $1 \leq l_0 \leq N$, and no DMRS has been configured for a time unit outside the first time unit set in the N time units or a quantity of configured DMRSs is less than the quantity of DMRSs configured for each time unit in the first time unit set. This manner may also be referred to as a spaced DMRS configuration manner.

The at least one time unit may be an $(l_0+L*i)^{th}$ time unit in the N time units, where L is a time unit interval, L and i are positive integers, $1 \leq L < N$, a value of i is 0, 1, . . . , or max, and max is the maximum positive integer that enables L*i to be less than N.

For example, $l_0=1$ and L=N−1. The RRC signaling is used to indicate a quantity of DMRSs configured for the first time unit in the N time units, and no DMRS has been configured for another time unit other than the first time unit in the N time units.

A schematic diagram of a DMRS pattern shown in FIG. 8A to FIG. 8F is used as an example. It is assumed that N=K1. The network device configures two DMRSs for the first time unit in K1 time units, including one front-loaded DMRS and one additional DMRS, where the front-loaded DMRS occupies one time domain symbol, and the additional DMRS occupies one time domain symbol. The network device has not configured any DMRS for the second time unit to a $K1^{th}$ time unit in the K1 time units. It is assumed that N=K2. The network device configures two DMRSs for the first time unit in K2 time units, including one front-loaded DMRS and one additional DMRS, where the front-loaded DMRS occupies one time domain symbol, and the additional DMRS occupies one time domain symbol. The network device has not configured any DMRS for the second time unit to a K2th time unit in the K2 time units. K1 and K2 may be the same or may be different.

For different time units, the value of N may be constant or may change dynamically. For example, the value of N is constant. The network device may configure a quantity of DMRSs at an interval of N−1 time units. Each time unit is configured with a same quantity of DMRSs. No DMRS has been configured for other time units. For example, it is assumed that N=5. If the network device configures two DMRSs at an interval of four time units, two DMRSs are configured for the first time unit, no DMRS has been configured for the second time unit to the fifth time unit, two DMRSs are configured for the sixth time unit, no DMRS has been configured for the seventh time unit to the tenth time unit. For example, the value of N changes dynamically. The network device may configure a quantity of DMRSs for K1 time units in K1+K2 time units. A quantity of DMRSs is configured for the first time unit in the K1 time units, and no DMRS has been configured for another time unit. The network device may configure a quantity of DMRSs for K2 time units in the K1+K2 time units. A quantity of DMRSs is configured for the first time unit in the K2 time units, and no DMRS has been configured for another time unit. For example, it is assumed that K1+K2=12, K1=5, and K2=7. The network device may configure a quantity of DMRSs for the first time unit and configure a quantity of DMRSs for the sixth time unit, no DMRS has been configured for the second time unit to the fifth time unit, and no DMRS has been configured for the seventh time unit to the twelfth time unit.

For another example, the network device configures a quantity of DMRSs in the N time units starting from an $l_0^{th}$ time unit at an interval of L time units. Each time unit is configured with a same quantity of DMRSs, and no DMRS has been configured for other time units. For example, it is assumed that N=5, $l_0$=1, and L=1. If the network device configures two DMRSs at an interval of one time unit, two DMRSs are configured for the first time unit, two DMRSs are configured for the third time unit, two DMRSs are configured for the fifth time unit, and no DMRS has been configured for the second time unit and the fourth time unit.

The foregoing three DMRS configuration manners are nonequivalent DMRS configuration manners, and are merely used as examples. In other words, quantities of DMRSs configured for different time units may be completely the same, or may be completely different.

4. The DMRS patterns indicate the total quantity of DMRSs configured for the N time units.

During specific implementation, the network device may configure a quantity of time units by using RRC signaling, that is, a value of N. The network device may further configure the DMRS patterns by using the RRC signaling. The DMRS patterns indicate the total quantity of DMRSs configured for the N time units. Based on this, the terminal device may determine, based on the DMRS patterns, the total quantity of DMRSs configured for each of the N time units.

For example, the network device may configure a total quantity of DMRSs in each of the N time units. It is assumed that dmrs-type=type 1 and maxlength=single. The network device configures four DMRSs for the first time unit in the N time units, configures two DMRSs for the second time unit in the N time units, and configures one DMRS for the third time unit in the N time units. For the DMRSs configured for the first time unit, AdditionalPosition=pos 3. For the DMRSs configured for the second time unit, AdditionalPosition=pos 1. For the DMRS configured for the third time unit, AdditionalPosition=pos 0. Therefore, the RRC signaling directly configures that AdditionalPosition={pos 3, pos 1, pos 0}, which respectively correspond to quantities of additional DMRSs of three time units.

For another example, the network device adds a type indication field MultiTTIDMRSType to the RRC signaling, where an optional value of the field is periodic, unequal 1, or unequal 2. When the value of the field is periodic, it indicates that in the DMRS patterns that are configured for the N time units and that are included in the RRC signaling, each time unit in a first time unit set in the N time units is configured with a same quantity of DMRSs, and no DMRS has been configured for a time unit outside the first time unit set in the N time units or a quantity of configured DMRSs is less than the quantity of DMRSs configured for each time unit in the first time unit set. When the value of the field is unequal 1, it indicates that in the DMRS patterns that are configured for the N time units and that are included in the RRC signaling, a quantity of DMRSs configured for the first k time units in the N time units is greater than a quantity of DMRSs configured for other time units than the first k time units. When the value of the field is unequal 2, it indicates that in the DMRS patterns that are configured for the N time units and that are included in the RRC signaling, a quantity of DMRSs configured for the first k time units in the N time units and a quantity of DMRSs configured for the last m time units in the N time units are both greater than a quantity of DMRSs configured for other time units than the first k time units and the last m time units in the N time units.

For another example, when the value of the MultiTTI-DMRSType field is periodic, the network device configures a total quantity of DMRSs in the first time unit by using the RRC signaling. For example, it is assumed that additionalPosition=pos 2. It indicates that three DMRSs are configured for the first time unit.

For another example, when the value of the MultiTTI-DMRSType field is unequal 1, the network device configures a total quantity of DMRSs in the first time unit and a total quantity of DMRSs in each of the second time unit to the $N^{th}$ time unit by using the RRC signaling. For example, it is assumed that additionalPosition={pos 2, pos 0}. It indicates that three DMRSs are configured for the first time unit, and one DMRS is configured for each of the second time unit to the $N^{th}$ time unit.

For another example, when the value of Multi time unit DMRSType field is unequal 2, the network device configures a total quantity of DMRSs in the first time unit, a total quantity of DMRSs in an $N^{th}$ time unit, and a total quantity of DMRSs in each of the second time unit to an $(N-1)^{th}$ time unit by using the RRC signaling. For example, it is assumed that additionalPosition={pos 2, pos 1, pos 0}. It indicates that three DMRSs are configured for the first time unit, two DMRSs are configured for the $N^{th}$ time unit, and one DMRS is configured for each of the second time unit to the $(N-1)^{th}$ time unit.

Step S502: The terminal device receives data in the N time units based on a total quantity of time domain symbols occupied by all DMRSs in each time unit and the scheduling information: or the terminal device maps data to a data channel based on a total quantity of time domain symbols occupied by all DMRSs in each time unit and the scheduling information, and sends the data. Correspondingly, the network device maps data to a data channel based on the total quantity of time domain symbols occupied by all the DMRSs in each time unit and the scheduling information, and sends the data: or the network device receives data in the N time units based on the total quantity of time domain symbols occupied by all the DMRSs in each time unit and the scheduling information.

When the scheduling information is used to indicate configuration information such as a time-frequency resource position for transmitting uplink data or a modulation scheme, the terminal device may send data in the N time units based on the total quantity of time domain symbols occupied by all the DMRSs in each time unit and the scheduling information. For example, the terminal device sends data to the network device in the N time units based on the total quantity of time domain symbols occupied by all the DMRSs in each time unit and the scheduling information, and the network device may receive the data from the terminal device in the N time units based on the total quantity of time domain symbols occupied by all the DMRSs in each time unit and the scheduling information.

When the scheduling information is used to indicate configuration information such as a time-frequency resource position for transmitting downlink data or a modulation scheme, the terminal device may receive data in the N time units based on the total quantity of time domain symbols occupied by all the DMRSs in each time unit and the scheduling information. For example, the network device may send data to the terminal device in the N time units based on the total quantity of time domain symbols occupied by all the DMRSs in each time unit and the scheduling information, and the terminal device receives the data from the network device in the N time units based on the total quantity of time domain symbols occupied by all the DMRSs in each time unit and the scheduling information.

In the method described in FIG. 5, the network device sends the RRC signaling to the terminal device. The RRC signaling indicates the scheduling information of the N time units, and the RRC signaling includes the DMRS patterns configured for the N time units, each DMRS pattern is used to indicate a quantity of DMRSs in each time unit, and DMRSs configured for at least two of the N time units occupy different total quantities of time domain symbols. The terminal device receives or sends data in the N time units based on the total quantity of time domain symbols occupied by all the DMRSs in each time unit and the scheduling information. In this embodiment of this application, DMRS patterns of a plurality of time units are configured by using RRC signaling. DMRSs configured for at least two of the plurality of time units occupy different total quantities of time domain symbols. Therefore, a current channel characteristic can be adapted to. For example, when a channel slowly changes, a periodic DMRS configuration is used, and a DMRS channel estimation result of the first time unit is reused for a subsequent time unit. In this way, accurate channel estimation and data demodulation can be ensured, DMRS pilot overheads can be reduced, and system spectral efficiency can be improved.

In FIG. 4, a DMRS pattern of at least one time unit is configured by using DCI signaling. Real-time and flexibility of DMRS configuration are higher, but a PDCCH needs to be frequently sent, and blind detection needs to be frequently performed on the PDCCH. As a result, PDCCH resource overheads are large, and blind detection complexity is high. In FIG. 5, DMRS patterns are of a plurality of time units are configured in an RRC signaling configuration manner, and blind detection does not need to be performed on the PDCCH. However, timeliness and flexibility of configuration are not as high as those in the solution shown in FIG. 4. An embodiment of this application may provide another method for configuring a DMRS, and DMRSs of a plurality of time units are configured in a semi-persistent scheduling (Semi-Persistent Scheduling, SPS) manner. Flexibility and PDCCH resource overheads/blind detection complexity are balanced. Configuration can be flexibly performed by adjusting/updating a PDCCH, and the PDCCH may not be sent when PDCCH does not need to be frequently updated, to reduce PDCCH blind detection overheads and DMRS pilot overheads.

A plurality of pieces of scheduling information such as a flexible time-frequency resource and a modulation scheme can be configured for each time unit in real time by using DCI, but correct reception of the PDCCH needs to be blindly detected by a terminal in a complex manner, and PDCCH transmission causes time-frequency resource overheads. Therefore, a semi-persistent scheduling mechanism is introduced in a 5G NR system. That is, a PDCCH is not frequently sent. Instead, after a PDCCH with an SPS identifier is initially configured, if DCI carried on the PDCCH does not need to be updated, a new PDCCH is not sent, and the terminal device always receives or sends a DMRS by using a DMRS pattern indicated by latest DCI. The PDCCH with the SPS identifier is sent again when the DCI carried on the PDCCH needs to be updated. By changing a sending period of the PDCCH with the SPS identifier, the 5G NR system can flexibly balance timeliness of data transmission/a flexible indication and a quantity of times of PDCCH blind detection/resource overheads.

Based on the method for configuring a DMRS in FIG. 4, when a DMRS pattern configured for at least one time unit in a next period is updated, updated DCI signaling is sent to the terminal device in the next period. The updated DCI signaling is scrambled by using an sps-C-RNTI.

During specific implementation, the network device may indicate, based on that a parameter RadioResourceContr-olDedicated in RRC signaling is configured as spsConfig, that a current resource configuration is an SPS configuration.

After initially sending the PDCCH scrambled by using the sps-C-RNTI, the network device updates the PDCCH in a pre-defined period based on a period only when DMRS configuration information of a plurality of time units indicated by the DCI needs to be updated, and sends the updated PDCCH scrambled by using the sps-C-RNTI to the terminal device. When the DMRS configuration information of the plurality of time units indicated by the DCI does not need to be updated, the network device stops sending the PDCCH to the terminal device, and DMRS configuration indications of the plurality of time units do not change. The PDCCH scrambled by using the sps-C-RNTI carries DCI to indicate DMRS configurations of the plurality of time units. An indication manner of the DCI is the same as the indication manner of the DCI shown in FIG. 4. Details are not described herein again. The period may be configured by using the RRC signaling.

The sps configuration manner is to activate/release an SPS resource by using the PDCCH scrambled by using the sps-C-Rnti. To be specific, when the terminal device checks, through CRC, that the sps-C-RNTI is correct and a corresponding field in the PDCCH meets a value condition, the terminal device considers that SPS transmission has been activated. The corresponding field in the PDCCH meets the value condition. For example, a value of a DNI is 0.

SPS is performed once for a plurality of times of use. In dynamic PDCCHs, each time unit is configured with a PDCCH, causing large control channel resource overheads.

Figure 9:
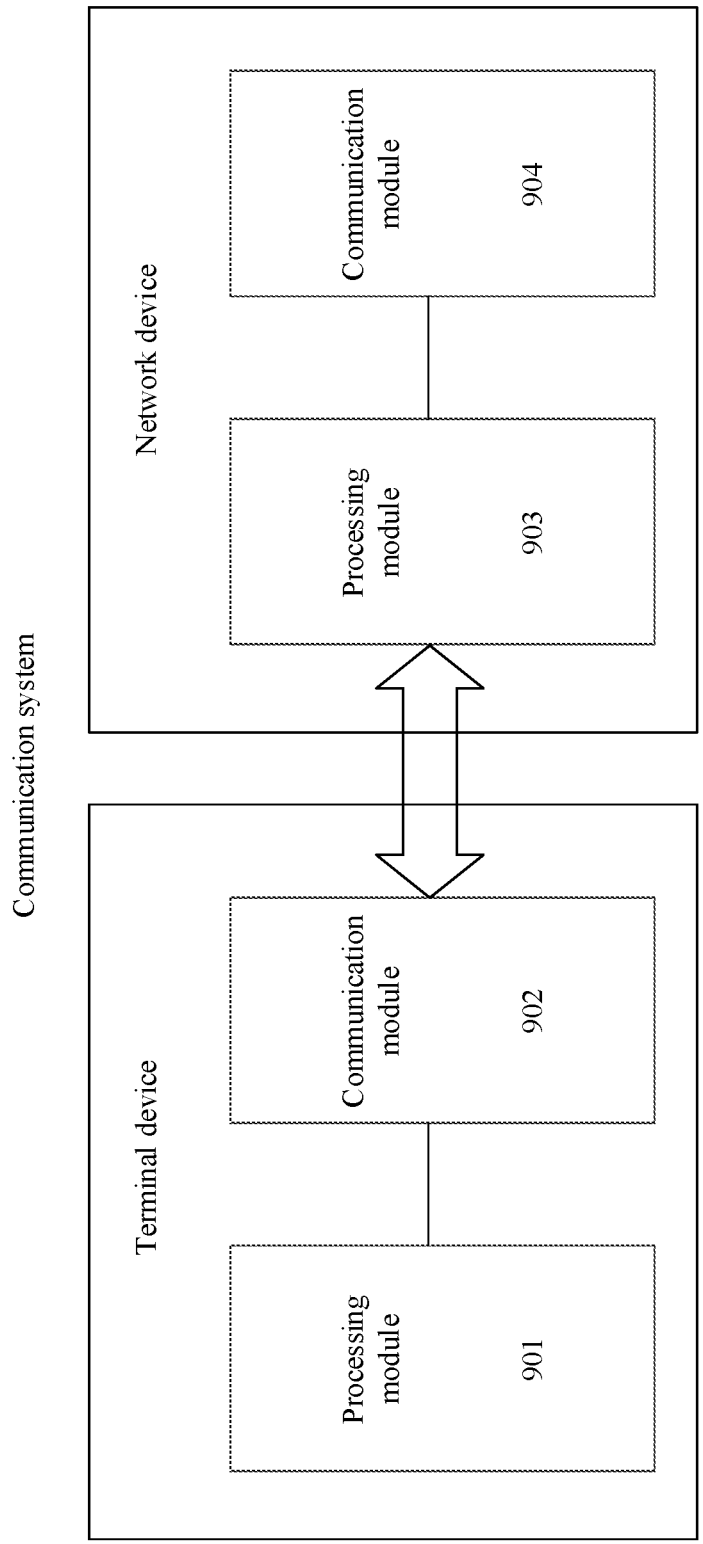
FIG. 9 is a schematic diagram of a structure of another communication system according to an embodiment of this application.

FIG. 9 is a schematic diagram of a structure of another communication system according to an embodiment of this application. As shown in FIG. 9, the communication system includes a network device and a terminal device. The terminal device can perform related functions of the terminal device in the foregoing methods. Therefore, for a same term and content, refer to the foregoing descriptions. Details are not described herein again. The terminal device includes at least one processing module 901 and a communication module 902. Correspondingly, the network device can perform related functions of the network device in the foregoing methods. The network device includes at least one processing module 903 and a communication module 904.

For example, the communication module 902 is configured to: receive first signaling, and receive or send data in N time units based on a total quantity of time domain symbols occupied by all DMRSs in each time unit and scheduling information. The first signaling indicates the scheduling information of the N time units, the first signaling includes DMRS patterns configured for N time units, each DMRS pattern is used to indicate a quantity of DMRSs in each time unit, the quantity of DMRSs in each time unit is a total quantity of time domain symbols occupied by all DMRSs in the time unit, DMRSs configured for at least two of the N time units occupy different total quantities of time domain symbols, and N is a positive integer greater than 1.

Optionally, the first signaling may be RRC signaling.

In a possible implementation, in the DMRS patterns that are configured for the N time units and that are included in the RRC signaling, a quantity of DMRSs configured for the first k time units in the N time units is greater than a quantity of DMRSs configured for other time units than the first k time units, k is a positive integer, and 1≤k<N.

In a possible implementation, in the DMRS patterns that are configured for the N time units and that are included in the RRC signaling, a quantity of DMRSs configured for the first k time units in the N time units and a quantity of DMRSs configured for the last m time units in the N time units are both greater than a quantity of DMRSs configured for other time units than the first k time units and the last m time units in the N time units, k is a positive integer, $1 \leq k < N-m$, and $1 \leq m < N-k$.

In a possible implementation, in the DMRS patterns that are configured for the N time units and that are included in the RRC signaling, each time unit in a first time unit set in the N time units is configured with a same quantity of DMRSs, the first time unit set includes at least one time unit in the N time units, the at least one time unit is a time unit starting from the $l_0^{th}$ time unit at an interval of L time units, $l_0$ is a positive integer, $1 \leq l_0 \leq N$, and no DMRS has been configured for a time unit outside the first time unit set in the N time units or a quantity of configured DMRSs is less than the quantity of DMRSs configured for each time unit in the first time unit set.

In a possible implementation, each of the DMRS patterns indicates a total quantity of DMRSs configured for each of the N time units, and the total quantity of DMRSs is a total quantity of front-loaded DMRSs and additional DMRSs.

After the communication module 902 receives the first signaling, the processing module 901 may determine, based on the DMRS patterns, a total quantity of DMRSs configured for each of the N time units.

Optionally, the first signaling may be DCI signaling.

In a possible implementation, the DCI signaling includes a first index value, and the first index value corresponds to a quantity of DMRSs in each of the N time units.

After the communication module 902 receives the first signaling, the processing module 901 may determine, based on the first index value, a quantity of DMRSs configured for each of the N time units.

In a possible implementation, the DCI signaling is scrambled by using an sps-C-RNTI.

In a possible implementation, a total quantity of time domain symbols occupied by all the DMRSs in each time unit is a total quantity of time domain symbols occupied by all front-loaded DMRSs and all additional DMRSs in the time unit.

It may be understood that for detailed implementation of the functional units included in the terminal device, refer to the foregoing embodiments. Details are not described herein again.

As shown in FIG. 9, the network device includes a communication module 904 and a processing module 903.

The communication module 904 is configured to: send first signaling to the terminal device, and receive or send data in the N time units based on the total quantity of time domain symbols occupied by all the DMRSs in each time unit and the scheduling information. The first signaling indicates the scheduling information of the N time units, the first signaling includes DMRS patterns configured for N time units, each DMRS pattern is used to indicate a quantity of DMRSs in each time unit, the quantity of DMRSs in each time unit is a total quantity of time domain symbols occupied by all DMRSs in the time unit, DMRSs configured for at least two of the N time units occupy different total quantities of time domain symbols, and N is a positive integer greater than 1.

Optionally, the first signaling is RRC signaling.

In a possible implementation, in the DMRS patterns that are configured for the N time units and that are included in the RRC signaling, a quantity of DMRSs configured for the first k time units in the N time units is greater than a quantity of DMRSs configured for other time units than the first k time units, k is a positive integer, and $1 \leq k < N$.

In a possible implementation, in the DMRS patterns that are configured for the N time units and that are included in the RRC signaling, a quantity of DMRSs configured for the first k time units in the N time units and a quantity of DMRSs configured for the last m time units in the N time units are both greater than a quantity of DMRSs configured for other time units than the first k time units and the last m time units in the N time units, k is a positive integer, $1 \leq k < N-m$, and $1 \leq m < N-k$.

In a possible implementation, in the DMRS patterns that are configured for the N time units and that are included in the RRC signaling, each time unit in a first time unit set in the N time units is configured with a same quantity of DMRSs, the first time unit set includes at least one time unit in the N time units, the at least one time unit is a time unit starting from the $l_0^{th}$ time unit at an interval of L time units, $l_0$ is a positive integer, $1 \leq l_0 \leq N$, and no DMRS has been configured for a time unit outside the first time unit set in the N time units or a quantity of configured DMRSs is less than the quantity of DMRSs configured for each time unit in the first time unit set.

In a possible implementation, each of the DMRS patterns indicates a total quantity of DMRSs configured for each of the N time units. The total quantity of DMRSs is the total quantity of front-loaded DMRSs and additional DMRSs.

Optionally, the first signaling is DCI signaling.

In a possible implementation, the DCI signaling includes a first index value, and the first index value corresponds to a quantity of DMRSs in each of the N time units.

In a possible implementation, the DCI signaling is scrambled by using an sps-C-RNTI.

In a possible implementation, a total quantity of time domain symbols occupied by all the DMRSs in each time unit is a total quantity of time domain symbols occupied by all front-loaded DMRSs and all additional DMRSs in the time unit.

It may be understood that for detailed implementation of the functional units included in the network device, refer to the foregoing embodiments. Details are not described herein again.

Division into the modules in this embodiment of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 10:
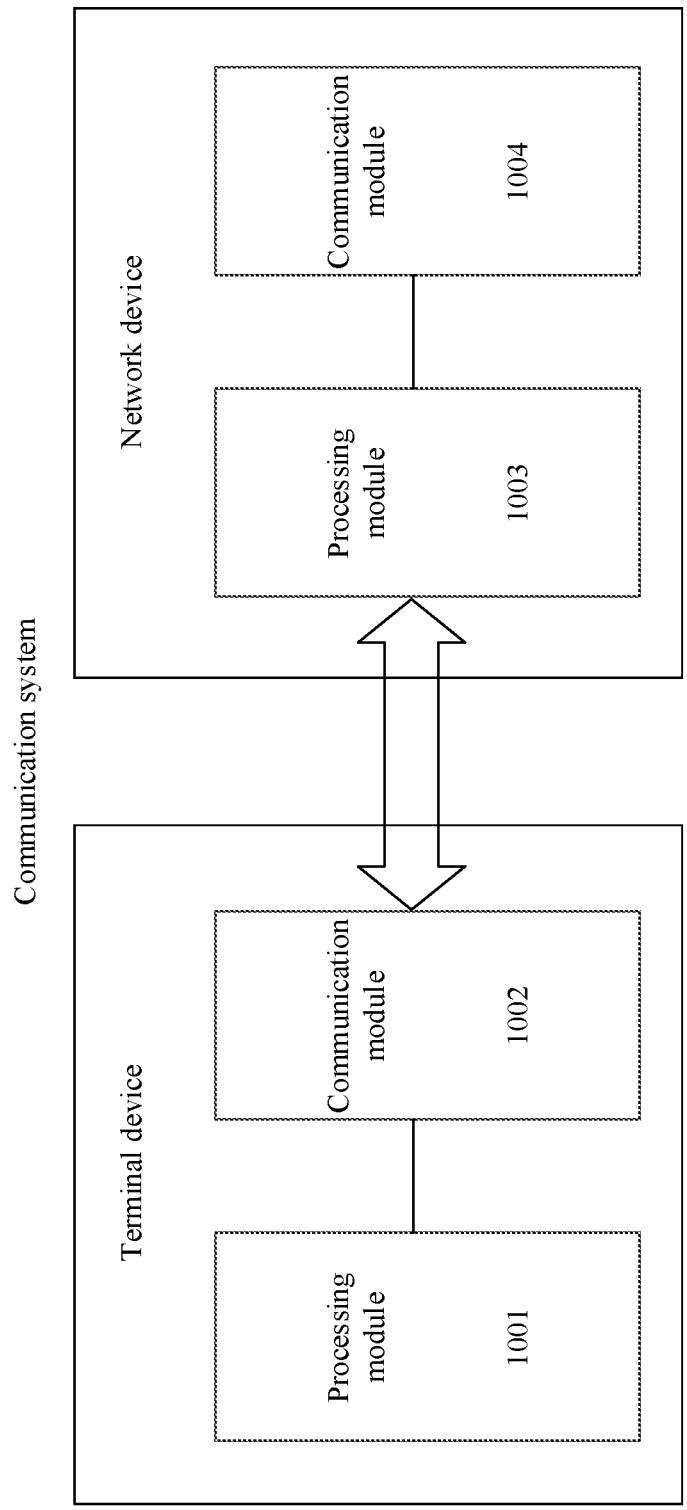
FIG. 10 is a schematic diagram of a structure of another communication system according to an embodiment of this application.

FIG. 10 is a schematic diagram of a structure of another communication system according to an embodiment of this application. As shown in FIG. 10, the communication system includes a network device and a terminal device. The terminal device can perform related functions of the terminal device in the foregoing methods. The terminal device includes at least one processing module 1001 and a communication module 1002. Correspondingly, the network device can perform related functions of the network device in the foregoing methods. The network device includes at least one processing module 1003 and a communication module 1004.

For example, the communication module 1002 is configured to: receive DCI, and receive or send data in a first time unit based on a total quantity of time domain symbols occupied by all DMRSs in the first time unit and scheduling information. The DCI indicates the scheduling information of the first time unit, the DCI includes a DMRS pattern configured for the first time unit, the DMRS pattern is used to indicate a quantity of DMRSs in the first time unit, and the quantity of DMRSs in the first time unit is a total quantity of time domain symbols occupied by all DMRSs in the first time unit.

In a possible implementation, the DCI includes a first field, and the first field includes a total quantity of DMRSs configured for the first time unit: or the first field includes an index value, and the index value indicates a total quantity of DMRSs configured for the first time unit.

After the communication module 1002 receives the DCI, the processing module 1001 may determine, based on the first field, the total quantity of DMRSs configured for the first time unit.

In a possible implementation, the DCI includes a first field, and the first field includes a quantity of DMRSs added to or deleted from the first time unit: or the first field includes an index value, and the index value indicates a quantity of DMRSs added to or deleted from the first time unit.

After the communication module 1002 receives the DCI, the processing module 1001 may determine, based on the first field and a pre-configured total quantity of DMRSs, a total quantity of DMRSs configured for the first time unit, where the total quantity of DMRSs is a total quantity of front-loaded DMRSs and additional DMRSs.

In a possible implementation, the DCI indicates that a total quantity of time domain symbols occupied by all DMRSs configured for the first time unit is 0.

In a possible implementation, the DCI indicates, by using the redundant state of CDM, that a total quantity of time domain symbols occupied by all DMRSs configured for the first time unit is 0.

In a possible implementation, that the communication module 1002 receives data in the first time unit based on the total quantity of time domain symbols occupied by all DMRSs in the first time unit and the scheduling information includes:

The processing module 1001 demodulates, based on the scheduling information and a DMRS in a second time unit, the data received in the first time unit, where the second time unit is before the first time unit.

In a possible implementation, the DCI is scrambled by using an sps-C-RNTI.

It may be understood that for detailed implementation of the functional units included in the terminal device, refer to the foregoing embodiments. Details are not described herein again.

As shown in FIG. 10, the network device includes a communication module 1004 and a processing module 1003.

The communication module 1004 is configured to send DCI to the terminal device, and receive or send data in the first time unit based on the total quantity of time domain symbols occupied by all the DMRSs in the first time unit and the scheduling information. The DCI indicates the scheduling information of the first time unit, the DCI includes a DMRS pattern configured for the first time unit, the DMRS pattern is used to indicate a quantity of DMRSs in the first time unit, and the quantity of DMRSs in the first time unit is a total quantity of time domain symbols occupied by all DMRSs in the first time unit.

In a possible implementation, the DCI includes a first field, and the first field includes a total quantity of DMRSs configured for the first time unit: or the first field includes an index value, and the index value indicates a total quantity of DMRSs configured for the first time unit.

In a possible implementation, the DCI includes a first field, and the first field includes a quantity of DMRSs added to or deleted from the first time unit: or the first field includes an index value, the index value indicates a quantity of DMRSs added to or deleted from the first time unit, a total quantity of DMRSs configured for the first time unit is determined based on the first field and a pre-configured total quantity of DMRSs, and the total quantity of DMRSs is a total quantity of front-loaded DMRSs and additional DMRSs.

In a possible implementation, the DCI indicates that a total quantity of time domain symbols occupied by all DMRSs configured for the first time unit is 0.

In a possible implementation, the DCI indicates, by using the redundant state of CDM, that a total quantity of time domain symbols occupied by all DMRSs configured for the first time unit is 0).

In a possible implementation, that the communication module 1004 receives data in the first time unit based on the total quantity of time domain symbols occupied by all DMRSs in the first time unit and the scheduling information includes:

The processing module 1003 demodulates, based on the scheduling information and a DMRS in a second time unit, the data received in the first time unit, where the second time unit is before the first time unit.

In a possible implementation, the DCI is scrambled by using an sps-C-RNTI.

It may be understood that for detailed implementation of the functional units included in the network device, refer to the foregoing embodiments. Details are not described herein again.

Division into the modules in this embodiment of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 11:
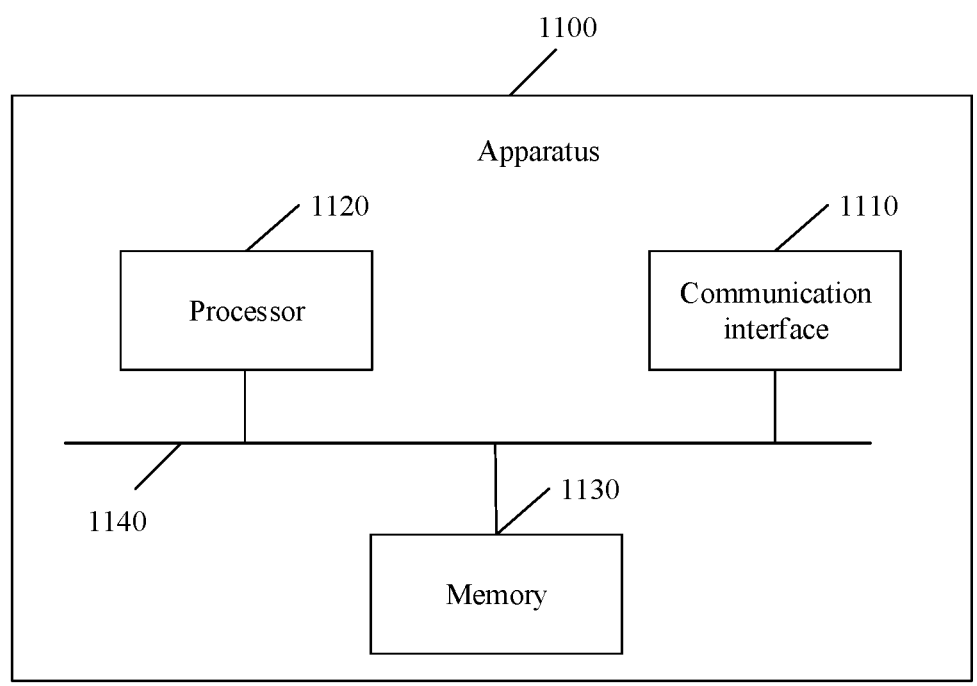
FIG. 11 is a schematic diagram of a structure of an apparatus according to an embodiment of this application.

FIG. 11 shows an apparatus 1100 according to an embodiment of this application. The apparatus is configured to implement a function of the network device or a function of the terminal device in the foregoing methods. The apparatus may be a network device, or may be an apparatus in the network device: or the apparatus may be a terminal device, or an apparatus in the terminal device. The apparatus may be a chip system. In this embodiment of this application, the chip system may include a chip, or may include a chip and another discrete component. The apparatus 1100 includes at least one processor 1120, configured to implement a function of the network device or a function of the terminal device in the methods provided in the embodiments of this application. For example, the processor 1120 determines, based on DMRS patterns, a total quantity of DMRSs configured for each of N time units. For details, refer to the detailed description in the methods. Details are not described herein again.

The apparatus 1100 may further include at least one memory 1130, configured to store program instructions and/or data. The memory 1130 is coupled to the processor 1120. The coupling in this embodiment of this application is indirect coupling or a communication connection between apparatuses, units, or modules for information exchange between the apparatuses, the units, or the modules, and may be in electrical, mechanical, or other forms. The processor 1120 may operate with the memory 1130 collaboratively. The processor 1120 may execute the program instructions stored in the memory 1130. At least one of the at least one memory may be included in the processor.

The apparatus 1100 may further include a communication interface 1110, configured to communicate with another device by using a transmission medium, so that an apparatus in the apparatus 1100 can communicate with another device. For example, the another device may be a terminal device or a network device. For example, the communication interface may be a transceiver, a circuit, a bus, a module, or a communication interface of another type. The processor 1120 sends and receives data through the communication interface 1110, and is configured to implement the method performed by the network device in the embodiment corresponding to FIG. 4 or FIG. 5, or is configured to implement the method performed by the terminal device in the embodiment corresponding to FIG. 4 or FIG. 5.

A specific connection medium between the communication interface 1110, the processor 1120, and the memory 1130 is not limited in this embodiment of this application. In this embodiment of this application, the memory 1130, the processor 1120, and the communication interface 1110 are connected by using a bus 1140 in FIG. 11. The bus is indicated by using a bold line in FIG. 11. A connection manner between other components is merely an example for description, and is not limited by reference. The bus may be classified into an address bus, a data bus, a control bus, and the like. For ease of representation, only one thick line is used to represent the bus in FIG. 11, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by using a combination of hardware and software modules in the processor.

In this embodiment of this application, the memory may be a non-volatile memory, such as a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessed by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A method for obtaining configuration information of a demodulation reference signal (DMRS), comprising:
   receiving, by a terminal device, first signaling from a network device, wherein the first signaling comprises DMRS patterns configured for N time units, wherein each respective DMRS pattern indicates a quantity of DMRSs in a respective time unit, wherein the quantity of DMRSs in the respective time unit is a total quantity of time domain symbols occupied by all DMRSs in the respective time unit, wherein DMRSs configured for at least two of the N time units occupy different total quantities of time domain symbols, and wherein N is a positive integer greater than 1; and
   receiving or sending, by the terminal device, data in the N time units based on the total quantity of time domain symbols occupied by all the DMRSs in each time unit of the N time units;
   wherein in the DMRS patterns configured for the N time units and comprised in the first signaling, a quantity of DMRSs configured for the first k time units in the N time units and a quantity of DMRSs configured for the last m time units in the N time units are both greater than a quantity of DMRSs configured for time units other than the first k time units and the last m time units in the N time units, where k is a positive integer, $1 \leq k < N-m$, and $1 \leq m < N-k$.

2. The method according to claim 1, wherein in the DMRS patterns that are configured for the N time units and that are comprised in the first signaling, each time unit in a first time unit set in the N time units is configured with a same quantity of DMRSs, the first time unit set comprises at least one time unit in the N time units, the at least one time unit is a time unit starting from the $l_0^{th}$ time unit at an interval of L time units, $l_0$ is a positive integer, $1 \leq l_0 \leq N$, and no DMRS has been configured for a time unit outside the first time unit set in the N time units or a quantity of configured DMRSs is less than the quantity of DMRSs configured for each time unit in the first time unit set.

3. The method according to claim 1, wherein each respective DMRS pattern indicates a total quantity of DMRSs configured for a respective time unit, and the total quantity of DMRSs is a total quantity of front-loaded DMRSs and additional DMRSs:
   wherein after receiving the first signaling, the method further comprises: determining, based on the DMRS patterns, the total quantity of DMRSs configured for each of the N time units.

4. The method according to claim 1, wherein the first signaling is radio resource control (RRC) signaling.

5. The method according to claim 1, wherein the first signaling is downlink control information (DCI) signaling, wherein the DCI signaling comprises a first index value, wherein the first index value corresponds to a respective value of N and a respective quantity of DMRSs per time unit; and
    wherein after receiving the first signaling, the method further comprises: determining, based on the first index value, the quantity of DMRSs configured for each of the N time units.

6. A method for configuring a demodulation reference signal (DMRS), comprising:
    sending, by a network device, first signaling to a terminal device, wherein the first signaling comprises DMRS patterns configured for N time units, wherein each respective DMRS pattern indicates a quantity of DMRSs in a respective time unit, wherein the quantity of DMRSs in the respective time unit is a total quantity of time domain symbols occupied by all DMRSs in the respective time unit, wherein DMRSs configured for at least two of the N time units occupy different total quantities of time domain symbols, and wherein N is a positive integer greater than 1; and
    receiving or sending, by the network device, data in the N time units based on the total quantity of time domain symbols occupied by all the DMRSs in each time unit of the N time units;
    wherein in the DMRS patterns configured for the N time units and comprised in the first signaling, a quantity of DMRSs configured for the first k time units in the N time units and a quantity of DMRSs configured for the last m time units in the N time units are both greater than a quantity of DMRSs configured for time units other than the first k time units and the last m time units in the N time units, where k is a positive integer, $1 \leq k < N-m$, and $1 \leq m < N-k$.

7. The method according to claim 6, wherein in the DMRS patterns that are configured for the N time units and that are comprised in the first signaling, each time unit in a first time unit set in the N time units is configured with a same quantity of DMRSs, the first time unit set comprises at least one time unit in the N time units, the at least one time unit is a time unit starting from the $l_0^{th}$ time unit at an interval of L time units, $l_0$ is a positive integer, $1 \leq l_0 \leq N$, and no DMRS has been configured for a time unit outside the first time unit set in the N time units or a quantity of configured DMRSs is less than the quantity of DMRSs configured for each time unit in the first time unit set.

8. The method according to claim 6, wherein each respective DMRS pattern indicates a total quantity of DMRSs configured for a respective time unit, and the total quantity of DMRSs is a total quantity of front-loaded DMRSs and additional DMRSs.

9. The method according to claim 6, wherein the first signaling is radio resource control (RRC) signaling.

10. The method according to claim 6, wherein the first signaling is downlink control information (DCI) signaling, wherein the DCI signaling comprises a first index value, wherein the first index value corresponds to a respective value of N and a respective quantity of DMRSs per time unit.

11. An apparatus, comprising:
    one or more memories configured to store instructions; and
    one or more processors coupled to the one or more memories and configured to execute the instructions to facilitate the following being performed by the apparatus:
    receiving first signaling from a network device, wherein the first signaling comprises demodulation reference signal (DMRS) patterns configured for N time units, wherein each respective DMRS pattern indicates a quantity of DMRSs in a respective time unit, wherein the quantity of DMRSs in the respective time unit is a total quantity of time domain symbols occupied by all DMRSs in the respective time unit, wherein DMRSs configured for at least two of the N time units occupy different total quantities of time domain symbols, and wherein N is a positive integer greater than 1; and
    receiving or sending data in the N time units based on the total quantity of time domain symbols occupied by all the DMRSs in each time unit of the N time units;
    wherein in the DMRS patterns configured for the N time units and comprised in the first signaling, a quantity of DMRSs configured for the first k time units in the N time units and a quantity of DMRSs configured for the last m time units in the N time units are both greater than a quantity of DMRSs configured for time units other than the first k time units and the last m time units in the N time units, where k is a positive integer, $1 \leq k < N-m$, and $1 \leq m < N-k$.

12. The apparatus according to claim 11, wherein the first signaling is radio resource control (RRC) signaling, and wherein in the DMRS patterns that are configured for the N time units and that are comprised in the first signaling, each time unit in a first time unit set in the N time units is configured with a same quantity of DMRSs, the first time unit set comprises at least one time unit in the N time units, the at least one time unit is a time unit starting from the $l_0^{th}$ time unit at an interval of L time units, $l_0$ is a positive integer, $1 \leq l_0 \leq N$, and no DMRS has been configured for a time unit outside the first time unit set in the N time units or a quantity of configured DMRSs is less than the quantity of DMRSs configured for each time unit in the first time unit set.

13. The apparatus according to claim 11, wherein the first signaling is radio resource control (RRC) signaling, wherein each respective DMRS pattern indicates a total quantity of DMRSs configured for a respective time unit, and the total quantity of DMRSs is a total quantity of front-loaded DMRSs and additional DMRSs; and
    wherein the one or more processors are further configured to execute the instructions to facilitate the following being performed by the apparatus: after receiving first signaling, determining, based on the DMRS patterns, the total quantity of DMRSs configured for each of the N time units.

14. The apparatus according to claim 11, wherein the first signaling is downlink control information (DCI) signaling, wherein the DCI signaling comprises a first index value, wherein the first index value corresponds to a respective value of N and a respective quantity of DMRSs per time unit; and
    wherein the one or more processors are further configured to execute the instructions to facilitate the following being performed by the apparatus: after the receiving first signaling, determining, based on the first index value, the quantity of DMRSs per time unit.

* * * * *

UNITED STATES PATENT AND TRADEMARK OFFICE
CERTIFICATE OF CORRECTION

PATENT NO. : 12,199,903 B2
APPLICATION NO. : 17/709029
DATED : January 14, 2025
INVENTOR(S) : Yu et al.

Page 1 of 1

It is certified that error appears in the above-identified patent and that said Letters Patent is hereby corrected as shown below:

In the Claims

Claim 3: Column 36, Line 63: "additional DMRSs:" should read as -- additional DMRSs; --.

Signed and Sealed this
Seventeenth Day of June, 2025

Coke Morgan Stewart
*Acting Director of the United States Patent and Trademark Office*